(12) United States Patent
Deng et al.

(10) Patent No.: US 12,356,140 B2
(45) Date of Patent: Jul. 8, 2025

(54) VIBRATION SENSORS

(71) Applicant: SHENZHEN SHOKZ CO., LTD., Guangdong (CN)

(72) Inventors: WenJun Deng, Shenzhen (CN); Yongshuai Yuan, Shenzhen (CN); Yujia Huang, Shenzhen (CN); Wenbing Zhou, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 84 days.

(21) Appl. No.: 18/173,043

(22) Filed: Feb. 22, 2023

(65) Prior Publication Data

US 2023/0199360 A1 Jun. 22, 2023

Related U.S. Application Data

(63) Continuation of application No. PCT/CN2021/129148, filed on Nov. 5, 2021.

(30) Foreign Application Priority Data

Dec. 28, 2020 (WO) ................ PCT/CN2020/140180
Apr. 23, 2021 (CN) .......................... 202110445739.3
Jul. 22, 2021 (WO) ................ PCT/CN2021/107978

(51) Int. Cl.
*H04R 1/08* (2006.01)
*H04R 1/04* (2006.01)
(Continued)

(52) U.S. Cl.
CPC ............. *H04R 1/2807* (2013.01); *H04R 1/04* (2013.01); *H04R 1/08* (2013.01); *H04R 1/083* (2013.01); *H04R 1/46* (2013.01)

(58) Field of Classification Search
CPC .......... H04R 1/2807; H04R 1/04; H04R 1/08; H04R 1/083; H04R 1/46
See application file for complete search history.

(56) References Cited

U.S. PATENT DOCUMENTS 6,075,866 A 6/2000 Frasl et al.
9,661,411 B1 5/2017 Han et al.
(Continued)

FOREIGN PATENT DOCUMENTS

CN 101644718 A 2/2010
CN 101644718 B 8/2011
(Continued)

OTHER PUBLICATIONS

English machine translation of CN209526861U (Duanmu et al.; Bone voiceprint sensor and electronic equipment; published Oct. 2019) (Year: 2019).*

(Continued)

*Primary Examiner* — Mark Fischer
(74) *Attorney, Agent, or Firm* — METIS IP LLC

(57) ABSTRACT

A vibration sensor (200) is provided, comprising: a vibration receiver (210) including a housing (211) and a vibration unit (212), the housing (211) forming an acoustic cavity, the vibration unit (212) being located in the acoustic cavity and separating the acoustic cavity into a first acoustic cavity (213) and a second acoustic cavity (214); and an acoustic transducer (220) acoustically connected to the first acoustic cavity (213). The housing (211) is configured to generate a vibration based on an external vibration signal, the vibration unit (212) changes an acoustic pressure within the first acoustic cavity (213) in response to the vibration of the housing (211), causing the acoustic transducer (220) to generate an electrical signal. The vibration unit (212) includes a quality element (2121) and an elastic element (2122), an area of the quality element (2121) on a side away (Continued)

from the acoustic transducer (220) is smaller than an area of the quality element (2121) on a side close to the acoustic transducer. The elastic element (2122) is connected around a side wall of the quality element (2121).

16 Claims, 10 Drawing Sheets

(51) Int. Cl.
*H04R 1/28* (2006.01)
*H04R 1/46* (2006.01)

(56) References Cited

U.S. PATENT DOCUMENTS

| | | | |
|---|---|---|---|
| 2014/0112503 | A1 | 4/2014 | Hebenstreit |
| 2016/0014530 | A1 | 1/2016 | Gao |
| 2018/0058915 | A1 | 3/2018 | Mogelin et al. |
| 2020/0389735 | A1 | 12/2020 | Yu et al. |
| 2020/0408593 | A1* | 12/2020 | Zhang .................... H04R 19/04 |
| 2023/0199370 | A1* | 6/2023 | Deng .................... H04R 1/2807 381/91 |

FOREIGN PATENT DOCUMENTS

| | | |
|---|---|---|
| CN | 202551344 U | 11/2012 |
| CN | 203407016 U | 1/2014 |
| CN | 203748006 U | 7/2014 |
| CN | 108513241 A | 9/2018 |
| CN | 208386931 U | 1/2019 |
| CN | 208434106 U | 1/2019 |
| CN | 209105452 U | 7/2019 |
| CN | 209314103 U | 8/2019 |
| CN | 110300364 A | 10/2019 |
| CN | 209526834 U | 10/2019 |
| CN | 209526836 U | 10/2019 |
| CN | 209526837 U | 10/2019 |
| CN | 209526861 U | 10/2019 |
| CN | 209526879 U | 10/2019 |
| CN | 209526886 U | 10/2019 |
| CN | 209659621 U | 11/2019 |
| CN | 110560351 A | 12/2019 |
| CN | 110602615 A | 12/2019 |
| CN | 110603819 A | 12/2019 |
| CN | 209882085 U | 12/2019 |
| CN | 209945545 U | 1/2020 |
| CN | 210093551 U | 2/2020 |
| CN | 110972045 A | 4/2020 |
| CN | 111031424 A | 4/2020 |
| CN | 111131988 A | 5/2020 |
| CN | 210513399 U | 5/2020 |
| CN | 210513400 U | 5/2020 |
| CN | 210609600 U | 5/2020 |
| CN | 210641062 U | 5/2020 |
| CN | 210641073 U | 5/2020 |
| CN | 210927933 U | 7/2020 |
| CN | 210958796 U | 7/2020 |
| CN | 211085470 U | 7/2020 |
| CN | 111510834 A | 8/2020 |
| CN | 111556419 A | 8/2020 |
| CN | 111818409 A | 10/2020 |
| CN | 211930817 U | 11/2020 |
| CN | 211930818 U | 11/2020 |
| CN | 211930820 U | 11/2020 |
| CN | 211930871 U | 11/2020 |
| CN | 211930872 U | 11/2020 |
| CN | 211959556 U | 11/2020 |
| CN | 212013049 U | 11/2020 |
| CN | 212086490 U | 12/2020 |
| CN | 212110308 U | 12/2020 |
| CN | 212183709 U | 12/2020 |
| CN | 212486781 U | 2/2021 |
| CN | 112565993 A | 3/2021 |
| CN | 112714389 A | 4/2021 |
| CN | 213280084 U | 5/2021 |
| CN | 111131988 B | 6/2021 |
| CN | 112995866 A | 6/2021 |
| CN | 213403413 U | 6/2021 |
| CN | 111065009 B | 7/2021 |
| CN | 213694145 U | 7/2021 |
| CN | 213783592 U | 7/2021 |
| CN | 113259795 A | 8/2021 |
| CN | 113259818 A | 8/2021 |
| EP | 1662236 A1 | 5/2006 |
| EP | 3342749 A2 | 7/2018 |
| JP | 2007300426 A | 11/2007 |
| WO | 2004068464 A2 | 8/2004 |
| WO | 2018224616 A1 | 12/2018 |
| WO | 2021031497 A1 | 2/2021 |
| WO | 2021031498 | 2/2021 |

OTHER PUBLICATIONS

English machine translation of CN212086490U (Yu et al.,; Vibration sensor and electronic device; published Dec. 2020) (Year: 2020).*
International Search Report in PCT/CN2020/140180 mailed on Oct. 9, 2021, 8 pages.
International Search Report in PCT/CN2021/107978 mailed on Oct. 21, 2021, 8 pages.
International Search Report in PCT/CN2021/129148 mailed on Jan. 27, 2022, 8 pages.
The Extended European Search Report in European Application No. 21913481.4 mailed on Apr. 25, 2024, 11 pages.
"Sound vibrations and waves", Web page <http://physiclib.ru/books/item/f00/s00/z0000016/st056.shtml>, 1984, 10 pages.
First Examination Report in Indian Application No. 202317014177 mailed on Mar. 18, 2024, 5 pages.
The Second Office Action in Russian Application No. 2023104828 mailed on Jan. 17, 2024, 30 pages.
Notice of Rejection in Japanese Application No. 2023521923 mailed on Jun. 17, 2024, 12 pages.
First Office Action in Russian Application No. 2023104828 mailed on Sep. 5, 2023, 32 pages.

* cited by examiner

VIBRATION SENSORS

CROSS REFERENCE TO RELATED APPLICATIONS

This application is a Continuation of International Patent Application No. PCT/CN2021/129148, filed on Nov. 5, 2021, which claims International Patent Application No. PCT/CN2020/140180, filed on Dec. 28, 2020, Chinese Patent Application No. 202110445739.3, filed on Apr. 23, 2021, and International Patent Application No. PCT/CN2021/107978, filed on Jul. 22, 2021, the entire contents of each of which are hereby incorporated by references.

TECHNICAL FIELD

The present disclosure relates to the technical field of acoustics, and in particular to a vibration sensor.

BACKGROUND

A vibration sensor is an energy transducer that converts a vibration signal into an electrical signal. Currently, the vibration sensor may be used as a bone conduction microphone. The vibration sensor can detect the vibration signal transmitted through the skin when a person speaks, thus detecting the speech signal while not being disturbed by external noise. At present, the structure of vibration components in the vibration sensor is not stable, which leads to the problem of low product yield in the production process of the vibration sensor and the low sensitivity of the vibration sensor in the working process.

Therefore, it is desirable to provide a vibration sensor with strong structural stability as well as high sensitivity.

SUMMARY

One embodiment of the present disclosure provides a vibration sensor, comprising: a vibration receiver including a housing and a vibration unit, the housing forming an acoustic cavity, the vibration unit being located in the acoustic cavity and separating the acoustic cavity into a first acoustic cavity and a second acoustic cavity; and an acoustic transducer acoustically connected to the first acoustic cavity, wherein the housing is configured to generate a vibration based on an external vibration signal, the vibration unit changes an acoustic pressure within the first acoustic cavity in response to the vibration of the housing, causing the acoustic transducer to generate an electrical signal; the vibration unit includes a quality element and an elastic element, an area of the quality element on a side away from the acoustic transducer is smaller than an area of the quality element on a side close to the acoustic transducer, and the elastic element is connected around a side wall of the quality element.

In some embodiments, the quality element includes a first quality element and a second quality element, the second quality element being located close to the acoustic transducer, the first quality element being located on a side of the second quality element away from the acoustic transducer, a cross-sectional area of the first quality element perpendicular to a vibration direction of the quality element being smaller than a cross-sectional area of the second quality element perpendicular to the vibration direction of the quality element.

In some embodiments, the first quality element is located in a central region of the second quality element, and a side wall of the first quality element has a specific distance to a side wall of the second quality element.

In some embodiments, the specific distance is in a range of 10 μm to 500 μm.

In some embodiments, the elastic element includes a first elastic portion and a second elastic portion, two ends of the first elastic portion being connected to the side wall of the first quality element and to the second elastic portion, respectively, the second elastic portion extending toward and connected to the acoustic transducer.

In some embodiments, the first elastic portion includes a first side surface and a second side surface, the first side surface being connected to the side wall of the first quality element, and the second side surface being connected to a surface exposed to the second acoustic cavity on the second quality element.

In some embodiments, the side wall of the second quality element is connected to the second elastic portion.

In some embodiments, the acoustic transducer includes a substrate, the second elastic portion extending toward and connected to the substrate, the substrate, the second quality element and the second elastic portion forming the first acoustic cavity.

In some embodiments, in the vibration direction of the quality element, a thickness of the first quality element is from 50 μm to 1000 μm and a thickness of the second quality element is from 10 μm to 150 μm.

In some embodiments, in the vibration direction of the quality element, the thickness of the first quality element is greater than the thickness of the second quality element.

In some embodiments, in a cross section obtained by the quality element in the vibration direction thereof, a connection line between an edge of the quality element on a side away from the acoustic transducer and an edge of the quality element on a side close to the acoustic transducer forms an angle with the vibration direction of the quality element, the angle being in a range of 10° to 80°.

In some embodiments, the quality element includes a first aperture portion, the first aperture portion connecting the first acoustic cavity and the second acoustic cavity.

In some embodiments, a radius of the first aperture portion is 1 μm to 50 μm.

In some embodiments, the housing includes a third aperture portion, the second acoustic cavity being connected to the exterior through the third aperture portion.

One embodiment of the present disclosure further provides a vibration sensor comprising: a vibration receiver including a housing and a vibration unit, the housing forming an acoustic cavity, the vibration unit being located in the acoustic cavity and separating the acoustic cavity into a first acoustic cavity and a second acoustic cavity; and an acoustic transducer acoustically connected to the first acoustic cavity, wherein the housing is configured to generate a vibration based on an external vibration signal, the vibration unit changes an acoustic pressure within the first acoustic cavity in response to the vibration of the housing, causing the acoustic transducer to generate an electrical signal; the vibration unit includes a quality element and an elastic element, the elastic element is connected around the side wall of the quality element and a limiting member is provided between the elastic element and the housing.

In some embodiments, a height of the limiting member is from 100 μm to 1000 μm in the vibration direction of the quality element.

One embodiment of the present disclosure further provides a vibration sensor comprising a vibration receiver including a housing and a vibration unit, the housing forming an acoustic cavity, the vibration unit being located in the acoustic cavity and separating the acoustic cavity into a first acoustic cavity and a second acoustic cavity; and an acoustic transducer acoustically connected to the first acoustic cavity, wherein the housing is configured to generate a vibration based on an external vibration signal, the vibration unit changes an acoustic pressure within the first acoustic cavity in response to the vibration of the housing, causing the acoustic transducer to generate an electrical signal; the vibration unit includes a quality element and an elastic element, the elastic element being connected around the side wall of the quality element, the quality element including a concave groove, the concave groove being located at a side of the quality element along the vibration direction of the quality element.

In some embodiments, the quality element includes a first aperture portion, the first aperture portion connecting the first acoustic cavity and the second acoustic cavity, the first aperture portion being located at the concave groove.

In some embodiments, a radius of the first aperture portion is 1 μm to 50 μm.

In some embodiments, a dimension of the concave groove is larger than a dimension of the first aperture portion.

One embodiment of the present disclosure also provides a vibration sensor comprising a vibration receiver including a housing and a vibration unit, the housing forming an acoustic cavity, the vibration unit being located in the acoustic cavity and separating the acoustic cavity into a first acoustic cavity and a second acoustic cavity; and an acoustic transducer acoustically connected to the first acoustic cavity, wherein the housing is configured to generate a vibration based on an external vibration signal, the vibration unit changes an acoustic pressure within the first acoustic cavity in response to the vibration of the housing, causing the acoustic transducer to generate an electrical signal; the vibration unit includes a quality element and an elastic element, the elastic element being connected around the side wall of the quality element and extending into the housing.

In some embodiments, a thickness of the elastic element is greater than a thickness of the quality element in the vibration direction of the quality element.

In some embodiments, the quality element or the housing is provided with an aperture portion, a radius of the aperture portion being 1 μm to 50 μm.

BRIEF DESCRIPTION OF THE DRAWINGS

The present disclosure is further illustrated in terms of exemplary embodiments. These exemplary embodiments are described in detail with reference to the drawings. These embodiments are not restrictive, in which the same numbering indicates the same structure, wherein.

DETAILED DESCRIPTION

Figure 1:
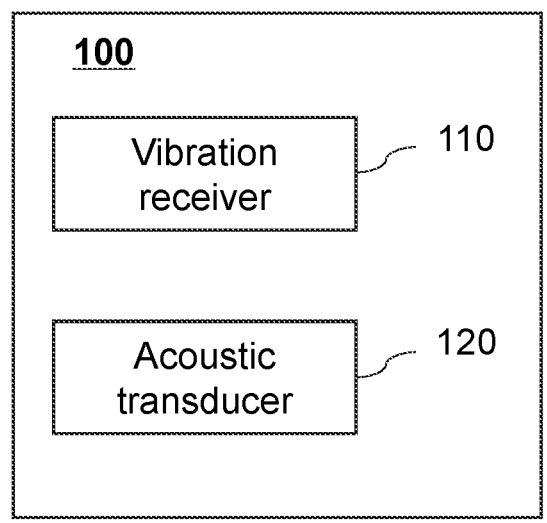
FIG. 1 is a diagram illustrating an exemplary framework of a vibration sensor according to some embodiments of the present disclosure.

In order to more clearly explain the technical scheme of the embodiments of this disclosure, a brief description of the accompanying drawings required for the embodiment description is given below. Obviously, the accompanying drawings below are only some examples or embodiments of this description, and it is possible for ordinary technicians skilled in the art to apply this description to other similar scenarios according to these accompanying drawings without creative effort. Unless obviously obtained from the context or the context illustrates otherwise, the same numeral in the drawings refers to the same structure or operation.

It should be understood that the "system", "device", "unit" and/or "module" used in this disclosure are a method used to distinguish different components, elements, parts, portions or assemblies of different levels. However, if other words may achieve the same purpose, the words may be replaced by other expressions.

The terms "first," "second," and similar terms used in this present disclosure and in the claims do not indicate any order, number, or importance, but are used only to distinguish the different components. Similarly, similar words such as "a", "an", or "one" do not indicate a limit to the number of words, but rather the existence of at least one. Unless otherwise noted, the terms "front," "rear," "lower," and/or "upper" and similar terms are for illustrative purposes only and are not limited to a location or a spatial orientation. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

Embodiments of this present disclosure describe a vibration sensor. In some embodiments, the vibration sensor may include a vibration receiver and an acoustic transducer. In some embodiments, the vibration receiver may include a housing and a vibration unit, the housing may form an acoustic cavity, and the vibration unit may be located in the acoustic cavity and separate the acoustic cavity into a first acoustic cavity and a second acoustic cavity. The acoustic transducer may be acoustically connected to the first acoustic cavity. The housing may be configured to generate a vibration based on an external vibration signal (e.g., a signal generated by a vibration of the user's bones, skin, etc., when he or she speaks). The vibration unit may change an acoustic pressure in the first acoustic cavity in response to the vibration of the housing, causing the acoustic transducer to generate an electrical signal.

In some embodiments, the vibration unit may include a quality element and an elastic element. An area of a side of a quality element away from the acoustic transducer is smaller than an area of the side of the quality element near the acoustic transducer. Under a same thickness condition, a contact area between the quality element and the elastic element in the embodiments of this present disclosure is increased relative to a contact area between a columnar (e.g., cylindrical or prismatic) quality element and the elastic element. When the elastic element is connected around the quality element, the connection area between the elastic element and the quality element is increased, which in turn increases the connection strength between the elastic element and the quality element and improves the stability of the structure of the vibration assembly. Further, by increasing the connection strength between the elastic element and the quality element and improving the sealing of the first acoustic cavity, the occurrence of a gap at the connection between the elastic element and the quality element can be effectively prevented such that the gas from the first acoustic cavity leaks into the second acoustic cavity can be further prevented, thereby making the acoustic pressure change in the first acoustic cavity in response to the housing vibration more sensitive, and further improving the sensitivity of the vibration sensor. FIG. 1 is a diagram illustrating an exemplary framework of a vibration sensor according to some embodiments of the present disclosure. As shown in FIG. 1, the vibration sensor 100 may include a vibration receiver 110 and an acoustic transducer 120. In some embodiments, the vibration receiver 110 and the acoustic transducer 120 may be physically connected. The physical connection in this present disclosure may include welding, clamping, gluing, integrated molding, or any combination thereof.

In some embodiments, the vibration sensor 100 may be used as a bone conduction microphone. When used as a bone conduction microphone, the vibration sensor 100 receives a vibration signal from the bones, skin, and other tissues generated when the user speaks and converts that vibration signal into an electrical signal containing sound information. Since capturing almost no sound (or vibration) in the air, the vibration sensor 100 is somewhat protected from ambient noise (e.g., the sound of others talking around, noise from vehicles driving by) and is suitable for use in a noisy environment to capture the voice signal as the user speaks. By way of example only, the noisy environment may include a noisy restaurant, a meeting place, a street, a position near a road, a fire scene, etc. In some embodiments, the vibration sensor 100 may be applied to a headphone (e.g., air-conduction headphones and bone-conduction headphones), a hearing aid, an assistive listening device, glasses, a headset, an augmented reality (AR) device, a virtual reality (VR) device, etc., or any combination thereof. For example, the vibration sensor 100 may be used as a bone conduction microphone in a headphone.

The vibration receiver 110 may be configured to receive and transmit the vibration signal. In some embodiments, the vibration receiver 110 includes a housing and a vibration unit. The housing may be an internally hollow structure, and portions of the vibration sensor 100 (e.g., the vibration unit) may be located within the housing. For example, the housing may form an acoustic cavity and the vibration unit may be located within the acoustic cavity. In some embodiments, the vibration unit may be located in the acoustic cavity and separate the acoustic cavity formed by the housing into a first acoustic cavity and a second acoustic cavity. The acoustic cavity may be acoustically connected to the acoustic transducer 120. The acoustic connection may be a connection capable of transmitting an acoustic pressure, a sound wave, or a vibration signal.

The acoustic transducer 120 may generate an electrical signal containing sound information based on the change in sound pressure in the first acoustic cavity. In some embodiments, the vibration signal may be received via the vibration receiver 110 and cause a change in air pressure inside the first acoustic cavity, and the acoustic transducer 120 may generate an electrical signal based on the change in the air pressure inside the first acoustic cavity. In some embodiments, when the vibration sensor 100 is operating, the housing may generate a vibration based on an external vibration signal (e.g., a signal generated by a vibration of the user's bones, skin, etc., when he/she speaks). The vibration unit may vibrate in response to the vibration of the housing and transmit that vibration through the first acoustic cavity to the acoustic transducer 120. For example, the vibration of the vibration unit may cause a change in the volume of the first acoustic cavity, which in turn causes a change in the air pressure inside the first acoustic cavity, and converts the change in the air pressure into a change in the acoustic pressure inside the first acoustic cavity. The acoustic transducer 120 may detect a change in acoustic pressure in the first acoustic cavity and generate an electrical signal based on this. For example, the acoustic transducer 120 may include a diaphragm, and the acoustic pressure inside the first acoustic cavity changes and acts on the diaphragm, causing the diaphragm to vibrate (or deform). The acoustic transducer 120 converts a vibration of the diaphragm into an electrical signal. For more information about the vibration sensor 100, please refer to FIG. 2A-FIG. 9 for a detailed description.

It should be noted that the above description of the vibration sensor 100 and its components is for example and illustration purposes only, and does not limit the scope of application of this present disclosure. For those skilled in the art, various corrections and changes can be made to the vibration sensor 100 under the guidance of this present disclosure. In some embodiments, the vibration sensor 100 may also include other components, such as a power supply, to provide electrical power to the acoustic transducer 120, etc. These amendments and changes remain within the scope of this present disclosure.

Figure 2A:
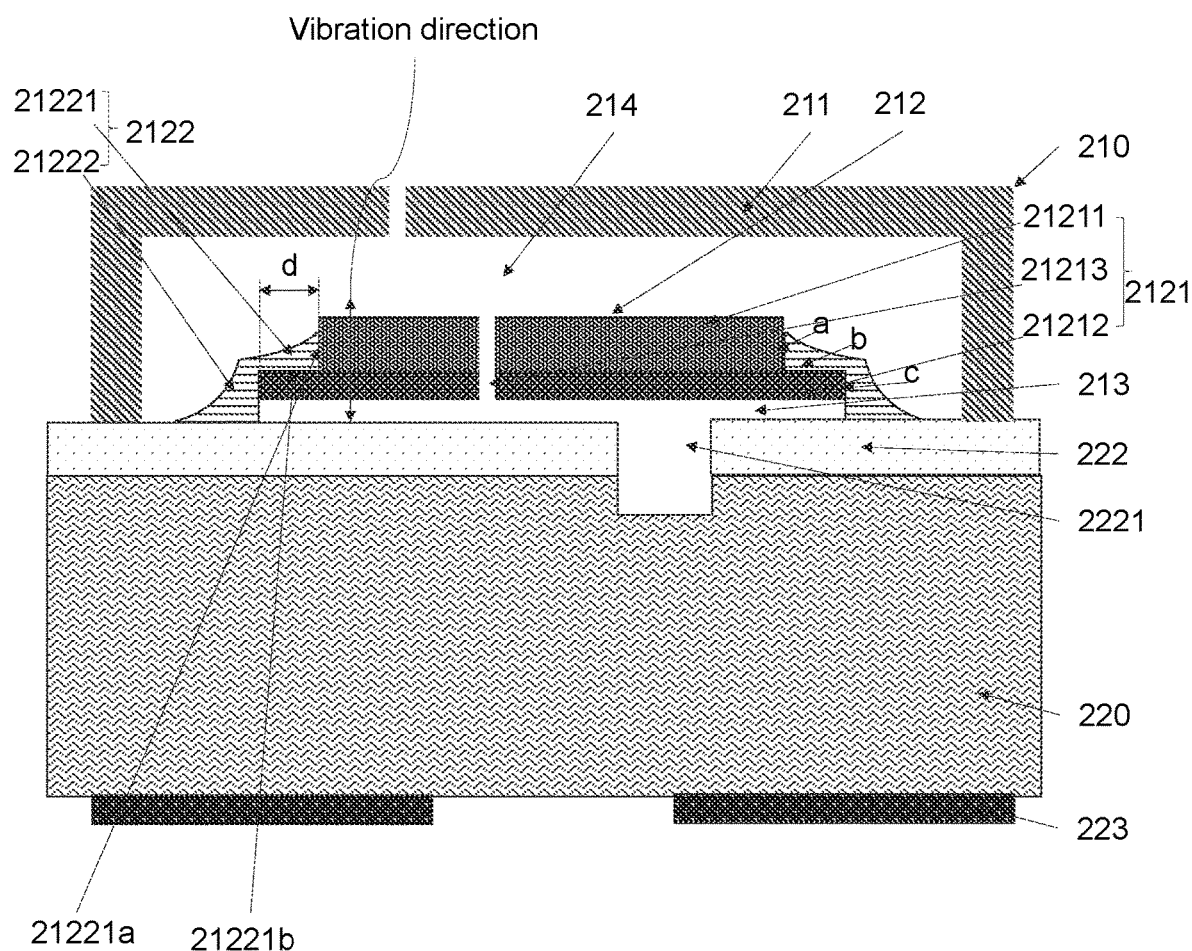
FIG. 2A is a diagram illustrating an exemplary structure of a vibration sensor according to some embodiments of the present disclosure.

FIG. 2A is a diagram illustrating an exemplary structure of a vibration sensor according to some embodiments of the present disclosure. As shown in FIG. 2A, the vibration sensor 200 may include a vibration receiver 210 and an acoustic transducer 220, wherein the vibration receiver 210 may include a housing 211 and a vibration unit 212.

The housing 211 may be an internally hollow structure, and in some embodiments, the housing 211 may be connected to the acoustic transducer 220 to enclose a structure with an acoustic cavity. The housing 211 and the acoustic transducer 220 may be physically connected to each other. In some embodiments, the vibration unit 212 may be located within the acoustic cavity, and the vibration unit 212 may separate the acoustic cavity into a first acoustic cavity 213 and a second acoustic cavity 214. In some embodiments, the vibration unit 212 may form a first acoustic cavity 213 with the acoustic transducer 220, and the vibration unit 212 may form a second acoustic cavity 214 with the housing 211.

The vibration sensor 200 may convert an external vibration signal into an electrical signal. By way of example only, the external vibration signal may include a vibration signal when a person speaks, a vibration signal generated by the skin with the movement of the body or with the operation of other devices (e.g., speakers) in close proximity to the skin, etc., a vibration signal generated by objects or air in contact with the vibration sensor 200, or any combination thereof. When the vibration sensor 200 works, the external vibration signal may be transmitted to the vibration unit 212 through the housing 211, and a quality element 2121 of the vibration unit 212 is driven by an elastic element 2122 to vibrate in response to the vibration of the housing 211. The vibration of the quality element 2121 may cause a volume change of the first acoustic cavity 213, which in turn causes a change of air pressure inside the first acoustic cavity 213, and converts the change of the air pressure inside the first acoustic cavity into a change of the acoustic pressure inside the first acoustic cavity. The acoustic transducer 220 may detect a change in acoustic pressure of the first acoustic cavity 213 and convert it to an electrical signal. For example, the acoustic transducer 220 may include a pickup aperture 2221, and the change in acoustic pressure of the first acoustic cavity 213 may act on the diaphragm of the acoustic transducer 220 through the pickup aperture 2221, causing the diaphragm to vibrate (or deform) to generate an electrical signal. Further, the electrical signal generated by the acoustic transducer 220 may be transmitted to an external electronic device. By way of example only, the acoustic transducer 220 may include an interface 223. The interface may be in wired (e.g., electrically connected to) or wireless connection with an internal element (e.g., processor) of an external electronic device. The electrical signal generated by the acoustic transducer 220 may be transmitted to the external electronic device via the interface in a wired or wireless manner. In some embodiments, the external electronic device may include a mobile device, a wearable device, a virtual reality device, an augmented reality device, etc., or any combination thereof. In some embodiments, the mobile device may include a smartphone, a tablet, a personal digital assistant (PDA), a gaming device, a navigation device, etc., or any combination thereof. In some embodiments, the wearable device may include a smart bracelet, headphones, hearing aids, a smart helmet, a smart watch, a smart garment, a smart backpack, a smart accessory, etc., or any combination thereof. In some embodiments, the virtual reality device and/or augmented reality device may include a virtual reality headset, virtual reality glasses, a virtual reality patch, an augmented reality headset, augmented reality glasses, an augmented reality patch, etc., or any combination thereof. For example, the virtual reality device and/or augmented reality device may include Google™ Glass, Oculus Rift™, Hololens, Gear™ VR, etc.

In some embodiments, a shape of the housing 211 may be a regular or an irregular three-dimensional structure such as a rectangle, a cylinder, a round table, etc. In some embodiments, the material of the housing may include metal (e.g., copper, stainless steel), alloy, plastic, etc., or any combination thereof. In some embodiments, the housing may have a thickness to ensure sufficient strength to better protect the components of the vibration sensor 100 (e.g., the vibration unit 212) set within the housing. In some embodiments, the first acoustic cavity 213 may be acoustically connected to the acoustic transducer 220. By way of example only, the acoustic transducer 220 may include the pickup aperture 2221, and the acoustic transducer 220 may be acoustically connected to the first acoustic cavity 213 through the pickup aperture 2221. It should be noted that the description of the individual pickup aperture 2221 as shown in FIG. 2A is for illustrative purposes only and is not intended to limit the scope of the present disclosure. It should be understood that the vibration sensor 200 may include more than one pickup aperture 2221. For example, the vibration sensor 200 may include multiple pickup apertures arranged in an array, wherein the pickup apertures may be located at any position of the acoustic transducer 220 corresponding to the first acoustic cavity 213.

In some embodiments, the vibration unit 212 may include the quality element 2121 and the elastic element 2122. In some embodiments, the quality element 2121 and the elastic element 2122 may be physically connected, e.g., glued together. By way of example only, the elastic element 2122 may be a material with some viscosity, bonded directly to the quality element 2121.

In some embodiments, the elastic element 2122 may be a material that is resistant to high temperatures, allowing the elastic element 2122 to maintain performance during processing and manufacturing of the vibration sensor 200. In some embodiments, the elastic element 2122 has no or very little change (e.g., within 5%) in Young's modulus and shear modulus when it is subjected to high temperate of 200° C. to 300° C., where the Young's modulus may be used to characterize the deformability of the elastic element 2122 when subjected to extension or compression, and the shear modulus may be used to characterize the deformability of the elastic element 2122 when subjected to shear. In some embodiments, the elastic element 2122 may be a material with good elasticity (i.e., susceptible to elastic deformation), allowing the vibration unit 212 to vibrate in response to the vibration of the housing 211. By way of example only, the material of the elastic element 2122 may include a silicone rubber, a silicone gel, a silicone sealant, etc., or any combination thereof. In order to make the elastic element 2122 more elastic, in some embodiments, the Shore hardness of the elastic element 2122 may be less than 50 HA. However, according to preference for example, the Shore hardness of the elastic element 2122 may be less than 45 HA, 40 HA, 35 HA, 30 HA, 25 HA, 20 HA, 15 HA, 10 HA, or 5 HA.

In some embodiments, the material of the quality element 2121 may be a material with a density greater than a certain density threshold (e.g., 6 g/cm$^3$), for example, a metal. By way of example only, the material of the quality element 2121 may include a metal or an alloy such as plumbum, copper, silver, tin, stainless steel, stainless iron, or any combination thereof. At the same quality, the higher the density of the material of the quality element 2121 is, the smaller the size is, so the quality element 2121 with a material whose density is greater than a certain density threshold can reduce the size of the vibration sensor 200 to some extent. In some embodiments, the material density of the quality element 2121 has a large effect on the resonance peak and sensitivity of the frequency response curve of the vibration sensor 200. The greater the density of the quality element 2121 is, the greater its quality is, the more the resonance peak of the vibration sensor 200 shifts toward lower frequencies. By increasing the quality of the quality element 2121, the sensitivity of the vibration sensor 200 can be improved in lower frequency bands (e.g., 20 Hz-6000 Hz) due to the lower frequency of the vibration signal (e.g., bone conduction sound). In some embodiments, the material density of the quality element 2121 is greater than 6 g/cm$^3$.

In some embodiments, the material density of the quality element 2121 is greater than 7 g/cm³. In some embodiments, the material density of the quality element 2121 is 7 to 20 g/cm³. According to preference for example, the material density of the quality element 2121 is 7 to 15 g/cm³, 7 to 10 g/cm³, or 7 to 8 g/cm³. In some embodiments, the quality element 2121 and the elastic element 2122 may be made of different materials and then assembled (e.g., glued) together to form the vibration unit 212. In some embodiments, the quality element 2121 and the elastic element 2122 may also be made of the same material, forming the vibration unit 212 by integrated molding.

In some embodiments, the quality element 2121 may have a thickness of 60 μm-1150 μm along its vibration direction (as shown in FIG. 2A). However, according to preference for example, the quality element 2121 may have a thickness of 70 μm-900 μm, 80 μm-800 μm, 90 μm-700 μm, 100 μm-600 μm, 110 μm-500 μm, 120 μm-400 μm, 130 μm-300 μm, 140 μm-200 μm, or 100 μm-150 μm, all alternatively, along its vibration direction.

In some embodiments, the elastic element 2122 may be connected around the circumferential surface of the quality element 2121. For example, when the quality element 2121 is a columnar structure (cylinder or prism), the circumferential surface of the quality element 2121 is the side surface of the columnar structure. As another example, when the quality element 2121 is a columnar structure of two different sizes (e.g., a first quality element 21211 and a second quality element 21212), the circumferential surface of the quality element 2121 includes, in addition to the side surfaces of the first quality element 21211 and the second quality element 21212, an area where the second quality element 21212 is not covered by the first quality element 21211 in a direction perpendicular to the vibration direction of the quality element 2121. A side surface of the quality element 2121 away from the acoustic transducer 220 and a side surface of the quality element 2121 near the acoustic transducer 220 are approximately perpendicular to the vibration direction and are used to define the second acoustic cavity 214 and the first acoustic cavity 213, respectively. Since the elastic element 2122 is connected around the circumferential surface of the quality element 2121, during the vibration of the vibration unit 212 in the vibration direction, the momentum of the quality element 2121 is converted into a force on the elastic element 2122, causing the elastic element 2122 to undergo shear deformation. Compared to extension and compression deformation, shear deformation reduces the spring coefficient of the elastic element 2122, which reduces the resonant frequency of the vibration sensor 200, thereby increasing the amplitude of the vibration of the quality element 2121 in the lower frequency range (e.g., 20 Hz-6000 Hz) during the vibration of the vibration unit 212, and improving the sensitivity of the vibration sensor 200. In some embodiments, the elastic element 2122 fits closely to the circumferential surface of the quality element 2121, which can ensure the hermeticity of the first acoustic cavity 213, so that the change of air pressure in the first acoustic cavity 213 is only related to the vibration amplitude of the vibration unit 212, which can make the change of acoustic pressure in the first acoustic cavity 213 more obvious and effective.

In some embodiments, the elastic element 2122 may be a tubular structure. Accordingly, the shape of the inner wall of the elastic element 2122 in the tubular structure may be adapted to the shape of the circumferential surface of the quality element 2121. It can be understood that, at different heights along the vibration direction, the inner wall of the elastic element 2122 has the same cross-sectional shape as the quality element 2121. The inner wall of the elastic element 2122 is a side wall where the tubular structure fits against the quality element 2121. For example, the quality element 2121 is stepped and a position where the elastic element 2122 is connected to the quality element 2121 is stepped to fit the quality element 2121. In some embodiments, the shape of the cross section of the quality element 2121 perpendicular to its vibration direction may be triangular, quadrilateral, circular, elliptical, sector, rounded rectangular, and other regular or irregular shapes. This present disclosure does not limit the shape of the outer wall of the tubular structure of the elastic element 2122. The outer wall of the elastic element 2122 may be a side wall that departs from the inner wall where the elastic element 2122 is connected to the quality element 2121. For example, the shape of the outer wall of the tubular structure of the elastic element 2122 may include a cylindrical shape, elliptical cylindrical shape, conical shape, rounded rectangular column, rectangular column, polygonal column, irregular column, etc. or any combination thereof.

In some embodiments, the elastic element 2122 may extend toward and connect to the acoustic transducer 220. For example, as shown in FIG. 2A, an end of the elastic element 2122 extending toward the acoustic transducer 220 may be connected to the acoustic transducer 220. The elastic element 2122 and the acoustic transducer 220 may be physically connected to each other, for example, by gluing, or welding. In some embodiments, the elastic element 2122 may also be connected to the acoustic transducer 220 via a connection member (not shown in FIG. 2A), where one end of the connection member is connected to the elastic element 2122 and the other end of the connection member is connected to the acoustic transducer 220. In some embodiments, the elastic element 2122 and the housing 211 may be in direct contact or spaced apart. For example, as shown in FIG. 2A, a distance may exist between the elastic element 2122 and the housing 211. The distance between the elastic element 2122 and the housing 211 may be adjusted by a designer according to the size of the vibration sensor 200. Compared to the direct contact between the elastic element 2122 and the housing 211, the presence of the distance between the elastic element 2122 and the housing 211 may reduce the equivalent stiffness of the elastic element 2122 and increase the elasticity of the elastic element 2122, thereby increasing the vibration amplitude of the quality element 2121 in the lower frequency range (e.g., 20 Hz-6000 Hz) during the vibration of the vibration unit 212 and improving the sensitivity of the vibration sensor 200.

In some embodiments, the area of the side of the quality element 2121 that is away from the acoustic transducer 220 is less than the area of the side of the quality element 2121 that is near the acoustic transducer 220. In some embodiments, the areas of the multiple cross sections of the quality element 2121 perpendicular to the vibration direction may all be different, for example, the quality element 2121 is a stepped structure. In order to increase the connection area between the elastic element 2122 and the circumferential surface of the quality element 2121, in some embodiments, the areas of the multiple cross sections of the quality element 2121 perpendicular to the vibration direction is gradually increased along the side of the quality element 2121 away from the acoustic transducer 220 to the side of the quality element 2121 near the acoustic transducer 220. In some embodiments, the areas of the multiple cross sections of the quality element 2121 perpendicular to the vibration direction may be partially identical, for example, the circumferential sides of the quality element 2121 may have a stepped structure. With a certain thickness of the quality element 2121 along its vibration direction, the areas of the multiple cross sections of the quality element 2121 perpendicular to the vibration direction are different, which can increase the circumferential surface area of the quality element 2121, which in turn makes the connection area between the elastic element 2122 and the quality element 2121 increase, improves the connection strength between the elastic element 2122 and the quality element 2121, strengthens the sealing of the first acoustic cavity, and makes the pressure change of the first acoustic cavity in response to the vibration of the housing more significant, thus improving the sensitivity of the vibration sensor.

Figure 2B:
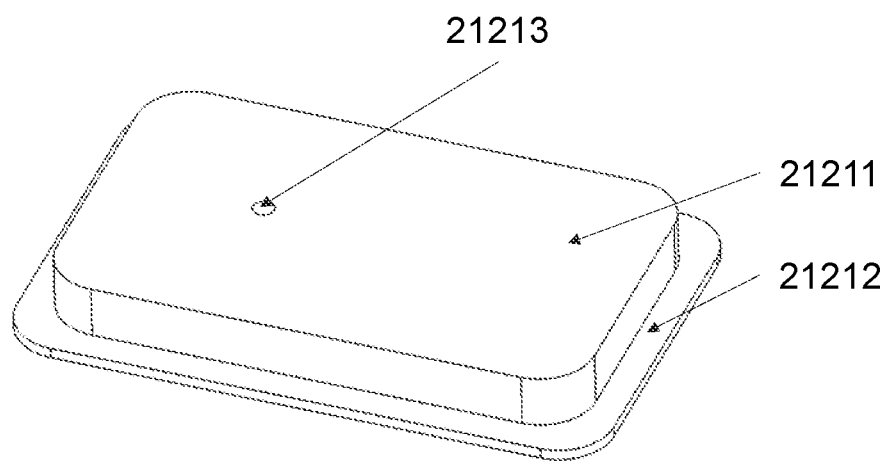
FIG. 2B is a schematic diagram illustrating a structure of a quality element according to some embodiments of the present disclosure.

In some embodiments, the circumferential surface of the quality element 2121 may be at least one level of the stepped structure. FIG. 2B is a schematic diagram illustrating a structure of the quality element 2121 according to some embodiments of the present disclosure. In conjunction with FIG. 2A and FIG. 2B, the quality element 2121 may include a first quality element 21211 and a second quality element 21212. The second quality element 21212 is located near the acoustic transducer 220, the first quality element 21211 is located on the side of the second quality element 21212 away from the second quality element 21212, and a cross-sectional area of the first quality element 21211 vertical to the vibration direction of the quality element 2121 is smaller than a cross-sectional area of the second quality element 21212 vertical to the vibration direction of the quality element 2121, so that the overall outer edge of the first quality element 21211 and the second quality element 21212 form a stepped structure. By way of exemplary illustration only, the circumferential surface of the quality element 2121 may include a sidewall a of the first quality element 21211, a region b of the second quality element 21212, and a sidewall c, with the sidewall a, region b, and sidewall c forming a stepped structure. The stepped structure may increase the area of the circumferential surface of the quality element 2121, and accordingly, the area of the elastic element 2122 connected to the side wall of the quality element 2121 is larger, which is conducive to the close fitting of the quality element 2121 and the elastic element 2122, so that there is a better sealing between the elastic element 2122 and the quality element 2121, which is conducive to ensuring the sealing of the first acoustic cavity 213. In some embodiments, the first quality element 21211 and the second quality element 21212 may be physically connected and fixed, e.g., glued (bonding by using a viscous gel such as an epoxy adhesive, silicon sealant, etc.), or may be molded in one piece. In some embodiments, the side surface of the first quality element 21211 near the acoustic transducer 220 and the side surface of the second quality element 21212 away from the acoustic transducer 220 may be physically connected and fixed.

In some embodiments, the side surface of the first quality element 21211 away from the acoustic transducer 220 is perpendicular to its vibration direction, and the side surface of the second quality element 2121 near the acoustic transducer 220 is perpendicular to its vibration direction. In some embodiments, the closer to the second quality element 2121 is, the larger the area of the cross-section of the first quality element 21211 that is perpendicular to its vibration direction, and the closer to the acoustic transducer 220 is, the larger the area of the cross-section of the second quality element 21212 that is perpendicular to its vibration direction. In some embodiments, the first quality element 21211 may be provided concentrically with the second quality element 21212, or not concentrically with the second quality element 21212. In some embodiments, the sidewall shape (i.e., a cross section perpendicular to the vibration direction) of the first quality element 21211 and/or the second quality element 21212 may include a cylindrical shape, an elliptical cylinder, a table shape, a rounded rectangular column shape (as shown in FIG. 2B), a rectangular column shape, a polygonal column shape, an irregular column shape (e.g., a column with multiple stepped surfaces), etc., or any combination thereof. In some embodiments, the sidewall shapes of the first quality element 21211 and the second quality element 21212 may be the same, for example, the sidewall shapes of both the first quality element 21211 and the second quality element 21212 are formed as a rounded rectangular column shape, as shown in FIG. 2B. In some embodiments, the sidewall shapes of the first quality element 21211 and the second quality element 21212 may be different, for example, the sidewall shape of the first quality element 21211 is formed as a cylindrical shape and the sidewall shape of the second quality element 21212 is formed as a rounded rectangular column shape. In some embodiments, the material of the first quality element 21211 and the material of the second quality element 21212 may or may not be the same, and by way of example only, the materials of the first quality element 21211 and the second quality element 21212 may include metals or alloys such as plumbum, copper, silver, tin, stainless steel, stainless iron, or any combination thereof. In some embodiments, the material density of the first quality element 21211 and the second quality element 21212 may be greater than 6 g/cm$^3$. In some embodiments, the material density of the first quality element 21211 and the second quality element 21212 may be greater than 7 g/cm$^3$.

In some embodiments, the first quality element 21211 is located in the middle region of the second quality element 21212 such that there are specific distances d (e.g., 10 μm to 1000 μm) between the side walls of the first quality element 21211 and the side walls of the second quality element 21212, i.e., a specific distance d between the side edges of the first quality element 21211 near the acoustic transducer 220 and the side edges of the second quality element 21212 away from the acoustic transducer 220. In some embodiments, the distances d between the side walls of the first quality element 21211 and the side walls of the second quality element 21212 may be equal everywhere. For example, when the first quality element 21211 and the second quality element 21212 are set concentrically, the shape of the side walls of the first quality element 21211 and the shape of the side walls of the second quality element 21212 are cylindrical structures, and the distances d between the side walls of the first quality element 21211 and the side walls of the second quality element 21212 are equal everywhere. In some embodiments, the distances d between the side walls of the first quality element 21211 and the side walls of the second quality element 21212 may not be equal everywhere. For example, the side walls of the first quality element 21211 are shaped as a cylindrical structure, the side walls of the second quality element 21212 are shaped as a rectangular column, and the distances between the edges of the side wall of the second quality element 21212 and the side wall of the first quality element 21211 are not equal. In some embodiments, the specific distances d may be 10 μm to 500 μm. According to preference for example, the specific distances d may be 20 μm to 450 μm, 30 μm to 400 μm, 40 μm to 350 μm, 50 μm to 300 μm, 60 μm to 250 μm, 70 μm to 200 μm, 80 μm to 150 μm, or 90 μm to 100 μm.

In some embodiments, the thickness of the first quality element 21211 in the vibration direction thereof may be greater than the thickness of the second quality element 21212 in the vibration direction thereof. By increasing the thickness of the first quality element 21211, not only can the overall quality of the quality element 2121 be increased, but also the connection area between the elastic element 2122 and the side wall a in the first quality element 21211 can be increased, thereby improving the connection strength between the elastic element 2122 and the quality element 2121. In some embodiments, the first quality element 21211 may have a thickness of 50 µm to 1000 µm along its vibration direction, and the second quality element 21212 may have a thickness of 10 µm to 150 µm along its vibration direction. However, according to preference for example, the first quality element 21211 may have a thickness of 60 µm to 900 µm, 20 µm to 130 µm, 70 µm to 800 µm, 30 µm to 120 µm, 80 µm to 700 µm, 40 µm to 110 µm, 90 µm to 600 µm, 50 µm to 100 µm, 100 µm to 500 µm, 60 µm to 90 µm, 200 µm to 400 µm, 60 µm to 90 µm, 300 µm to 350 µm, or 70 µm to 80 µm, all alternatively, along its vibration direction.

It should be noted that the quality element 2122 is not limited to the structure including the first quality element 21211 and the second quality element 21212 shown in FIG. 2A and FIG. 2B, but may also include a third quality element, a fourth quality element, or more quality elements. When the quality element 2122 includes more than two quality elements, a stepped structure may be formed between the sidewalls of each two quality elements.

In some embodiments, the elastic element 2122 may include a first elastic portion 21221 and a second elastic portion 21222, the first elastic portion 21221 is connected around a side wall of the first quality element 21211, and the second elastic portion 21222 is connected around a side wall of the second quality element 21212. The first elastic portion 21221 and the second elastic portion 21222 may be physically connected, e.g., glued, or welded. In some embodiments, the first elastic portion 21221 and the second elastic portion 21222 may be of one-piece molded structure. In some embodiments, the first elastic portion 21221 fits closely against the side wall of the first quality element 21211, the second elastic portion 21222 fits closely against the side wall of the second quality element 21212, and the first elastic portion 21221 is hermetically connected to the second elastic portion 21222. In some embodiments, the two ends of the first elastic portion 21221 may be connected to the second elastic portion 21222 and the side wall of the first quality element 21211, respectively. In some embodiments, the two ends of the first elastic portion 21221 may be hermetically connected to the second elastic portion 21222 and the side wall of the first quality element 21211, respectively. The first elastic portion 21221 may include a first side surface 21221a and a second side surface 21221b, the first side surface 21221a is connected to a side wall of the first quality element 21211, and the second side surface 21221b is connected to a surface on the second quality element 21212 that is exposed to the second acoustic cavity 214. The second side surface 21221b of the first elastic portion 21221 may be connected to a step surface of the second quality element 21212, and the step surface of the second quality element 21212 has a supporting effect on the first elastic portion 21221. The second side surface 21221b of the first elastic portion 21221 may be connected to the second elastic portion 21222. The side wall of the second quality element 21212 is connected to the second elastic portion 21222. In some embodiments, the second elastic portion 21222 extends toward and is connected to the acoustic transducer 220 (e.g., substrate 222). In some embodiments, the two ends of the second elastic portion 21222 may be connected to the side wall of the second quality element 21212, the acoustic transducer 220, respectively. One end of the second elastic portion 21222 connected to the side wall of the second quality element 21212 may also be connected to the first elastic portion 21221. In some embodiments, the shape of the first side surface 21221a of the first elastic portion 21221 is adapted to the shape of the side wall of the first quality element 21211. For example, the shape of the cross section of the first quality element 21211 perpendicular to its vibration direction may be triangular, quadrilateral, circular, elliptical, scalloped, rounded rectangular, and other regular or irregular shapes, and at each height along the vibration direction of the first quality element 21211, the shape of the cross section of the first side surface 21221a perpendicular to the vibration direction of the first quality element 21211 is the same as the shape of the cross section of the first quality element 21211. In some embodiments, the shape of the side wall of the second elastic portion 21222 near the side wall of the second quality element 21212 is adapted to the shape of the side wall of the second quality element 21212. For example, the cross-sectional shape of the second quality element 21212 perpendicular to its vibration direction may be triangular, quadrilateral, circular, elliptical, scalloped, rounded rectangular, and other regular or irregular shapes, at each height of the vibration direction, the second elastic portion 21222 near the side wall of the second quality element 21212 has the same cross-sectional shape as the cross-sectional shape of the side wall of the second quality element 21212 perpendicular to the vibration direction. This present disclosure does not limit the side shape of the first elastic portion 21221 away from the side wall of the first quality element 21211 and the side shape of the second elastic portion 21222 away from the side wall of the second quality element 21212, for example, their side shapes may include cylindrical, elliptical cylindrical, conical, rounded rectangular column, rectangular column, polygonal column, irregular column shape, or any combination thereof. In some embodiments, the materials of the first elastic portion 21221 and the second elastic portion 21222 may be the same or different. By way of example only, the materials of the first elastic portion 21221 or the second elastic portion 21222 may include silicone rubber, silicone gel, silicone sealant, etc., or any combination thereof.

In some embodiments, the quality element 2121 may also include a first aperture portion 21213, and the first aperture portion 21213 connects the first acoustic cavity 213 and the second acoustic cavity 214. The first aperture portion 21213 may penetrate the quality element 2121, and the first aperture portion 21213 may allow gas flow within the first acoustic cavity 213 and the second acoustic cavity 214, thereby balancing the change in air pressure inside the first acoustic cavity 213 and the second acoustic cavity 214 due to temperature changes during the preparation of the vibration sensor 200 (e.g., during reflow soldering) and reducing or preventing damage to the components of the vibration sensor 200 caused by such change in air pressure, e.g., cracking, deformation, etc.

In some embodiments, the first aperture portion 21213 may be a single aperture structure. In some embodiments, a diameter of this single aperture may be 1-50 µm. However, according to preference for example, the diameter of the single aperture may be 2-45 µm, 3-40 µm, 4-35 µm, 5-30 µm, 5-25 µm, 5-20 µm, 6-15 µm, or 7-10 µm. In some embodiments, the first aperture portion 21213 may be an array of a certain number of micro-apertures. By way of example only, the number of micro-apertures may be 2-10. In some embodiments, the diameter of each micro-aperture may be 0.1-25 μm. However, according to preference for example, the diameter of each micro-aperture may be 0.5-20 μm, 0.5-25 μm, 0.5-20 μm, 0.5-15 μm, 0.5-10 μm, 0.5-5 μm, 0.5-4 μm, 0.5-3 μm, 0.5-2 μm, or 0.5-1 μm.

In some embodiments, the quality element 2121 may be provided without the first aperture portion 21213. In some embodiments, when the quality element 2121 is not provided with the first aperture portion 21213, damage to the components of the vibration sensor 200 due to changes in air pressure inside the first acoustic cavity 213 can be avoided by increasing the connection strength between the quality element 2121 and the elastic element 2122 (e.g., by enhancing the bonding strength of the glue between the quality element 2121 and the elastic element 2122).

In some embodiments, the acoustic transducer 220 may include a substrate 222. The substrate 222 may be used to hold and/or support the vibration receiver 210. In some embodiments, the substrate 222 may be provided on the acoustic transducer 220, and the housing 211 is physically connected to the substrate 222 to enclose the acoustic cavity. In some embodiments, one end of the elastic element 2122 extending toward the acoustic transducer 220 may be connected to the substrate 222, which may be used to hold and support the vibration unit 212. The substrate 222 is provided so that the vibration receiver 210 can be processed, manufactured, and sold as a separate component. The vibration receiver 210 with the substrate 222 may be physically connected (e.g., glued) directly to the acoustic transducer 220 to obtain the vibration sensor 200, which simplifies the production process of the vibration sensor 200 and increases the process flexibility for producing the vibration sensor 200. In some embodiments, the thickness of the substrate 222 may be 10 μm to 300 μm. According to preference for example, the thickness of the substrate 222 may be 20 μm to 280 μm, 30 μm to 270 μm, 40 μm to 250 μm, or 80 μm to 90 μm. In some embodiments, the material of the substrate 222 may include a metal (e.g., iron, copper, stainless steel, etc.), an alloy, a non-metal (plastic, rubber, resin), etc., or any combination thereof.

In some embodiments, the pickup aperture 2221 may be located on the substrate 222, with the pickup aperture 2221 passing through the substrate 222 in the vibration direction. The change in acoustic pressure within the first acoustic cavity 213 may act on the acoustic transducer 220 through the pickup aperture 2221 to generate an electrical signal.

It should be noted that the above description of the vibration sensor 200 and its components is for example and illustration purposes only, and does not limit the scope of application of this present disclosure. For the person skilled in the art, various modifications and changes can be made to the vibration sensor 200 under the guidance of this present disclosure, for example, the vibration sensor 200 may include at least one first aperture 21213, and the first aperture 21213 may be provided through the elastic element 2122. These amendments and changes remain within the scope of this present disclosure.

Figure 3:
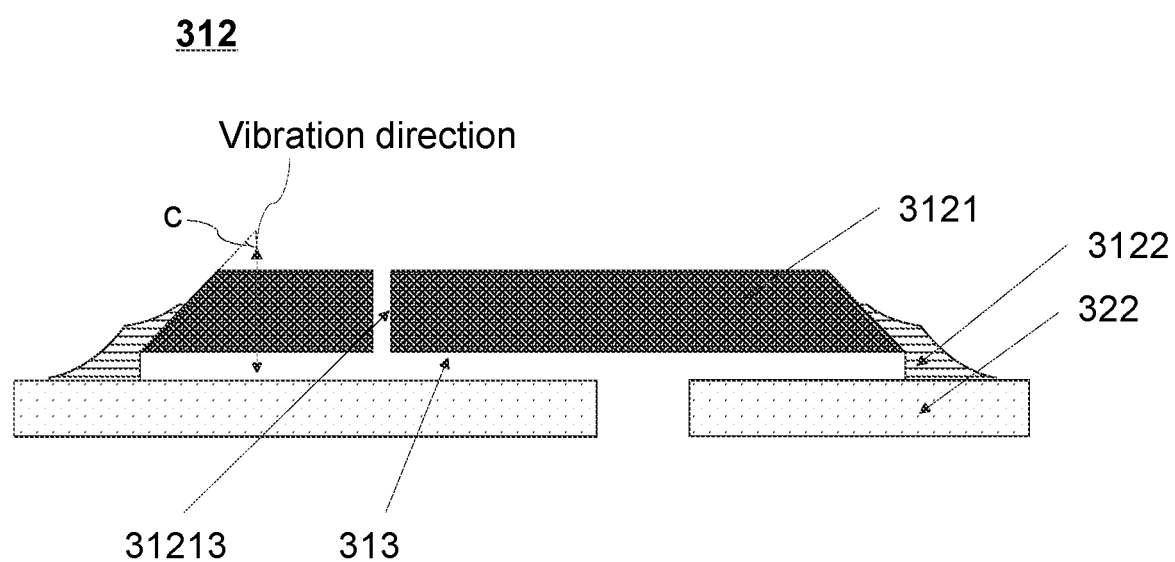
FIG. 3 is a schematic diagram illustrating a structure of a vibration unit according to some embodiments of the present disclosure.

In order to ensure that the elastic element and the quality element have a large connection area, and thus improve the connection strength between the elastic element and the quality element, the quality element meeting the condition that the area of the side of the quality element away from the acoustic transducer is less than the area of the side of the quality element near the acoustic transducer may also be other structures. FIG. 3 is a schematic diagram illustrating a structure of the vibration unit 312 according to some embodiments of the present disclosure. As shown in FIG. 3, the area of the side of the quality element 3121 away from the acoustic transducer is smaller than the area of the side of the quality element 3121 near the acoustic transducer, and in the cross section of the quality element 3121 along its vibration direction (as shown in FIG. 3), a side surface connecting an edge of the side of the quality element 3121 away from the acoustic transducer and an edge of the side of the quality element 3121 near the acoustic transducer is an inclined surface. Connecting the elastic element 3122 to the inclined surface ensures that the elastic element 3122 and the quality element 3121 have a large connection area, which in turn improves the connection strength between the elastic element 3122 and the quality element 3121.

In some embodiments, the side surface connecting the side of the quality element 3121 that is away from the acoustic transducer and the side of the quality element 3121 that is close to the acoustic transducer may be a smooth inclined surface. In some embodiments, the side surface connecting the side of the quality element 3121 away from the acoustic transducer and the side of the quality element 3121 near the acoustic transducer may be an inclined surface having multiple concaves and convex, for example, the inclined surface may be a wavy or serrated structure. In some embodiments, in the cross section of the quality element 3121 along its vibration direction, the connection line between the edge of the side of the quality element 3121 away from the acoustic transducer and the edge of the side of the quality element 3121 near the acoustic transducer forms an angle with the vibration direction of the quality element 3121, the angle c may be 10°-80°. The set range of this angle c may avoid that when the angle c is too small, the optimization of the connection strength between the elastic element 3122 and the quality element 3121 is not obvious, and when the angle c is too large, the area of the quality element 3121 away from the side of the acoustic transducer is too small, causing the mass of the quality element 3121 to be too small. According to preference for example, the angle c may be 20°-70°, 30°-60°, 40°-50°, 42°-48°, or 44°-46°.

In some embodiments, the elastic element 3122 is connected around the side surface connecting the side of the quality element 3121 that is away from the acoustic transducer and the side of the quality element 3121 that is near the acoustic transducer. In some embodiments, one end of the elastic element 3122 is connected to the inclined surface of the quality element 3121, and the other end of the elastic element 3122 is connected to the acoustic transducer. A first acoustic cavity 313 is formed among a side of the quality element 3121 near the acoustic transducer, the elastic element 3122, and the acoustic transducer. In some embodiments, the shape of the end face of the elastic element 3122 connected to the inclined surface of the quality element 3121 is adapted to the shape of the inclined surface of the quality element 3121. For example, the edge of the side surface is a wavy or serrated curve, and the outer edge of the end face of the elastic element 3122 connected to the articulated side is also a wavy or serrated curve. The present disclosure does not limit the shape of one side of the elastic element 3122 exposed to the second acoustic cavity; for example, the edge of the side of the elastic element 3122 exposed to the second acoustic cavity in the cross section of the quality element 3121 along its vibration direction may be an irregular curve with multiple concaves and convex.

In some embodiments, the quality element 3121 may also include a first aperture portion 31213 that penetrates the quality element 3121 to allow for gas flow within the first acoustic cavity 313 and the second acoustic cavity. In some embodiments, the first aperture portion 31213 may be a single aperture structure. In some embodiments, the first aperture portion 31213 may be an array of a certain number of micro-apertures. By way of example only, the number of micro-apertures may be from 2 to 10.

In some embodiments, a substrate 322 may be used to hold and/or support the vibration unit 312. In some embodiments, one end of the elastic element 3122 connected to the acoustic transducer may be connected to the substrate 322 such that the substrate 322 may be used to hold and support the vibration unit 312. In some embodiments, the substrate 322 may include a pickup aperture 2221 for acoustically connecting the first acoustic cavity 313 to the acoustic transducer.

It should be noted that the above description of the vibration unit 312 and its components is for example and illustration purposes only, and does not limit the scope of application of this present disclosure. For those skilled in the art, various modifications and changes can be made to the vibration unit 312 under the guidance of this present disclosure, for example, the vibration sensor 200 may include at least two elastic elements. The elastic element is connected to the elastic element, the elastic element near the quality element is connected to the quality element, and the quality element near the acoustic transducer is connected to the acoustic transducer. These amendments and changes remain within the scope of this present disclosure.

Figure 4:
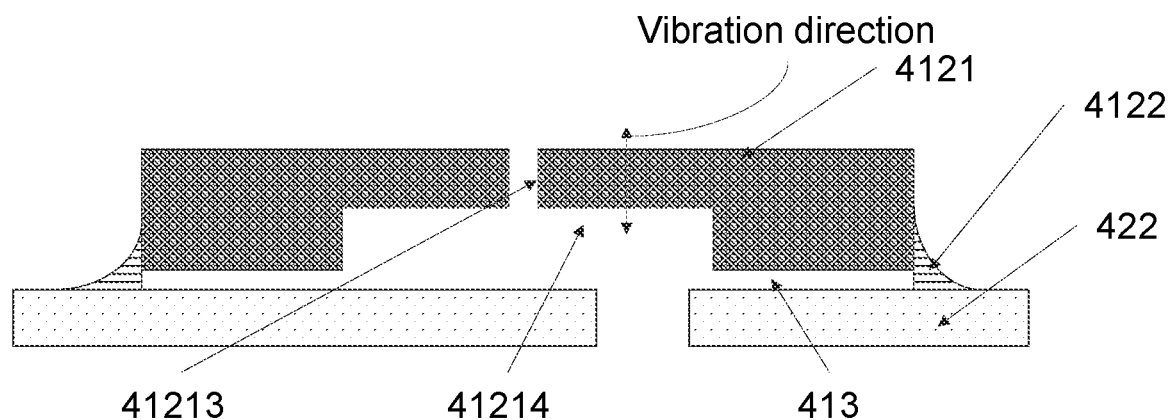
FIG. 4 is a schematic diagram illustrating a structure of a vibration unit according to some embodiments of the present disclosure.

The opening of the first aperture portion on the quality element may damage some of the components of the acoustic transducer (e.g., the substrate). To prevent the opening of the first aperture portion from damaging the acoustic transducer, in some embodiments, the quality element may include one or more second aperture portions (also referred to as concave grooves) with the first aperture portion connected to the second aperture portion(s). FIG. 4 is a schematic diagram illustrating a structure of the vibration unit 412 according to some embodiments of the present disclosure. As shown in FIG. 4, two ends of an elastic element 4122 are physically connected to a side wall of a quality element 4121, the acoustic transducer, respectively, such as a glued connection, and a first acoustic cavity 413 is formed among a side surface of the quality element 4121 near the acoustic transducer, the elastic element 4122, and the acoustic transducer.

In the case where the quality element 4121 needs to have a first aperture portion 41213, it is not easy to machine the first aperture portion 41213 due to the large overall thickness of the quality element 4121 along its vibration direction. In some embodiments, a second aperture portion 41214 may be provided on the quality element 4121, and the first aperture portion 41213 is connected to the second aperture portion 41214. In some embodiments, the quality element 4121 may include one or more second aperture portions 41214. The second aperture portion 41214 is provided so that the local structure of the quality element 4121 is thinned to facilitate the opening of the first aperture portion 41213 at the thinned local structure, and to facilitate the control of the force of machining the first aperture portion 41213 so that no damage is caused to other components of the vibration sensor (e.g., substrate 422, acoustic transducer) during the machining of the first aperture portion 41213. In some embodiments, the second aperture portion 41214 is located at the side of the quality element 4121 along its vibration direction. For example, the second aperture portion 41214 may be located on the side of the quality element 4121 near or away from the substrate 422. In some embodiments, the first aperture portion 41213 and the second aperture portion 41214 are provided along the vibration direction of the quality element 4121, wherein the first aperture portion 41213 and the second aperture portion 41214 penetrate the quality element 4121. In some embodiments, the second aperture portion 41214 may or may not be provided concentrically with the quality element 4121. In some embodiments, the first aperture portion 41213 may or may not be provided concentrically with the second aperture portion 41214.

In some embodiments, the second aperture portion 41214 and/or the first aperture portion 41213 may be a square aperture, a polygonal aperture, a round aperture, an irregular aperture, etc., or any combination thereof, and the present disclosure does not limit the aperture shape of the second aperture portion 41214 and the first aperture portion 41213. In some embodiments, the first aperture portion 41213 may or may not have the same aperture shape as the second aperture portion 41214. In some embodiments, the first aperture portion 41213, and the second aperture portion 41214 may both be single aperture structures. In some embodiments, the second aperture portion 41214 may be a single aperture structure and the first aperture portion 31213 may be an array of a certain number of micro apertures.

In some embodiments, the size of the second aperture portion 41214 is larger than the size of the first aperture portion 41213, facilitating the machining of the first aperture portion 41213 within the second aperture portion 41214. In some embodiments, the cross-sectional area of the second aperture portion 41214 perpendicular to the vibration direction of the quality element 4121 is greater than the cross-sectional area of the first aperture portion 41213 perpendicular to the vibration direction of the quality element 4121. When both the second aperture portion 41214 and the first aperture portion 41213 are round holes, the aperture diameter of the second aperture portion 41214 may be 100 μm to 1600 μm, and the aperture diameter of the first aperture portion 41213 may be 1 μm to 50 μm. As a preference, the aperture diameter of the second aperture portion 4121 may be 110 μm to 1400 μm and the aperture diameter of the first aperture portion 41213 may be 2 μm to 45 μm. As another preference, the aperture diameter of the second aperture portion 41214 may be 120 μm to 1200 μm and the aperture diameter of the first aperture portion 41213 may be 3 μm to 40 μm. As another preference, the aperture diameter of the second aperture portion 41214 may be 130 μm to 1000 μm and the aperture diameter of the first aperture portion 41213 may be 4 μm to 35 μm. As another preference, the aperture diameter of the second aperture portion 41214 may be 140 μm to 800 μm and the aperture diameter of the first aperture portion 41213 may be 5 μm to 30 μm. As another preference, the aperture diameter of the second aperture portion 41214 may be 160 μm to 600 μm and the aperture diameter of the first aperture portion 41213 may be 5 μm to 25 μm. As another preference, the aperture diameter of the second aperture portion 41214 may be 180 μm to 500 μm and the aperture diameter of the first aperture portion 41213 may be 5 μm to 20 μm. As another preference, the aperture diameter of the second aperture portion 41214 may be 200 μm to 400 μm and the aperture diameter of the first aperture portion 41213 may be 10 μm to 15 μm.

Figure 5:
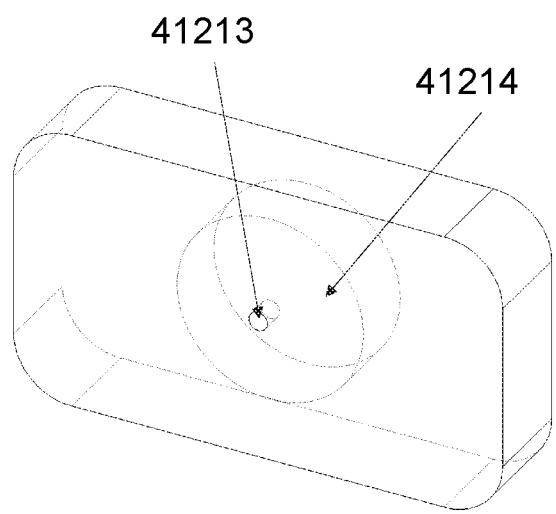
FIG. 5 is a schematic diagram illustrating a structure of a quality element according to some embodiments of the present disclosure.

FIG. 5 is a schematic diagram illustrating a structure of the quality element 4121 shown in FIG. 4. The second aperture portion 41214 is provided on the side of the quality element 4121 near the acoustic transducer, and the first aperture portion 41213 is provided on the side of the quality element 4121 away from the acoustic transducer. The second aperture portion 41214 and the first aperture portion 41213 pass through the quality element 4121.

Figure 6A:
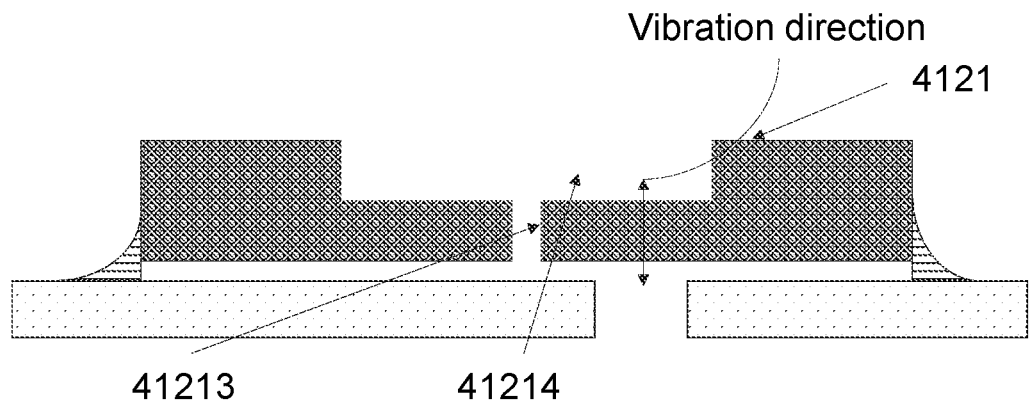
FIG. 6A is a schematic diagram illustrating a structure of a vibration unit according to some embodiments of the present disclosure.
Figure 6B:
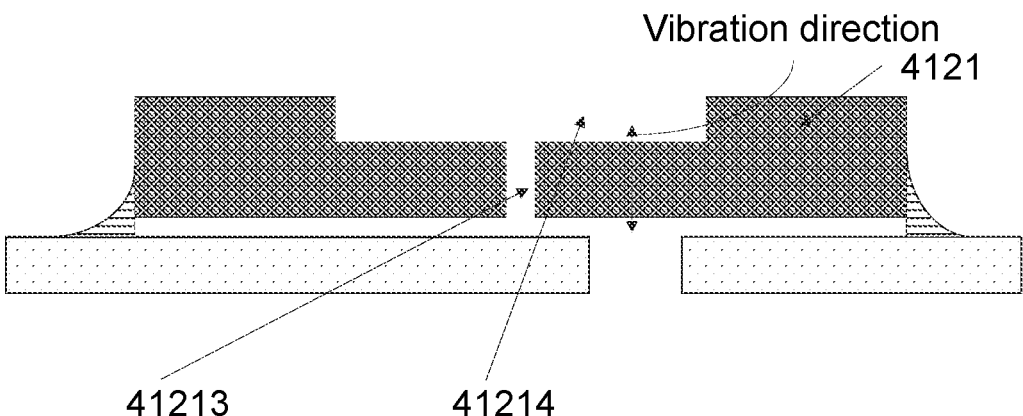
FIG. 6B is a schematic diagram illustrating a structure of a vibration unit according to some embodiments of the present disclosure.
Figure 6C:
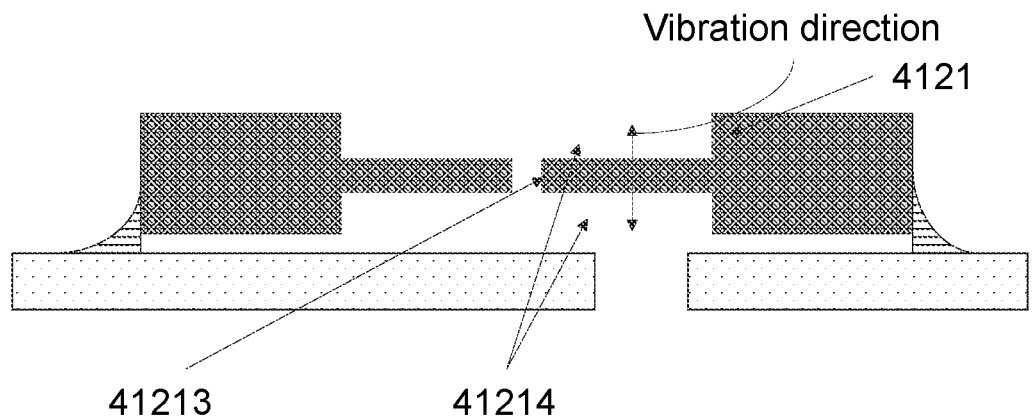
FIG. 6C is a schematic diagram illustrating a structure of a vibration unit according to some embodiments of the present disclosure.
Figure 6D:
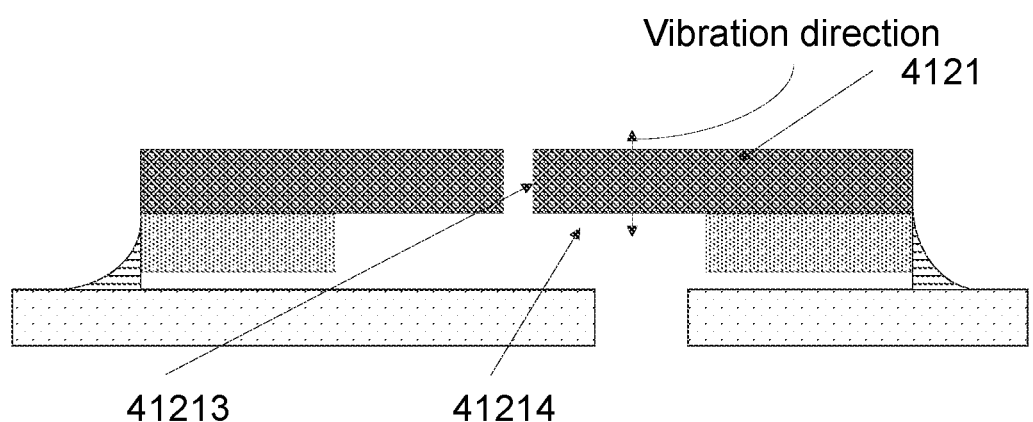
FIG. 6D is a schematic diagram illustrating a structure of a vibration unit according to some embodiments of the present disclosure.

FIG. 6A is a schematic diagram illustrating a structure of the vibration unit 412 according to some embodiments of the present disclosure. As shown in FIG. 6A, the second aperture portion 41214 may also be located on the side of the quality element 4121 that is away from the acoustic transducer, and the first aperture portion 41213 is provided on the side of the quality element 4121 near the acoustic transducer, with the second aperture portion 41214 and the first aperture portion 41213 passing through the quality element 4121. In some embodiments, the depth of the first aperture portion 41213 along the vibration direction of the quality element 4121 may be greater than, less than, or equal to the depth of the second aperture portion 41214 along the vibration direction of the quality element 4121. By way of example only, FIG. 6B is a schematic diagram illustrating a structure of the vibration unit 412 according to some embodiments of the present disclosure. As shown in FIG. 6B, the second aperture portion 41214 is located on the side of the quality element 4121 away from the acoustic transducer, the first aperture portion 41213 is located on the side of the quality element 4121 near the acoustic transducer, with the second aperture portion 41214 and the first aperture portion 41213 passing through the quality element 4121. The depth of the first aperture portion 41213 along the vibration direction of the quality element 4121 is greater than the depth of the second aperture portion 41214 along the vibration direction of the quality element 4121. FIG. 6C is a schematic diagram illustrating a structure of the vibration unit 412 according to some embodiments of the present disclosure. As shown in FIG. 6C, in some embodiments, the quality element 4121 is provided with second aperture portions 41214 on both sides near, and away from, the acoustic transducer, and the second aperture portions 41214 on both sides of the quality element 4121 are connected through the first aperture portion 41213. In some embodiments, the vibration unit 412 may include multiple layers of stacked quality elements 4121. The materials of the multiple layers of quality elements 4121 may be the same, not identical, or not identical at all. The first aperture portion 41213 passes through some of the quality elements 4121, the second aperture portions 41214 pass through some of the quality elements 4121, and the first aperture portion 41213 is connected to the second aperture portions 41214. By way of example only, FIG. 6D is a schematic diagram illustrating a structure of the vibration unit 412 according to some embodiments of the present disclosure. As shown in FIG. 6D, the vibration unit 412 may include two layers of stacked quality elements 4121. The two layers of the quality elements 4121 have different materials, the first aperture portion 41213 passes through the quality element 4121 that is away from the acoustic transducer and the second aperture portion 41214 passes through the close quality element 4121, and the first aperture portion 41213 is connected to the second aperture portion 41214.

It should be noted that the above description of the vibration unit 412 and its components is for example and illustration purposes only, and does not limit the scope of application of this present disclosure. For those skilled in the art, various corrections and changes can be made to the vibration unit 412 under the guidance of this present disclosure, for example, the second aperture portion 41214 and the first aperture portion 41213 can be provided through the side wall of the quality element 4121. These amendments and changes remain within the scope of this present disclosure. It should be noted that the second aperture portion 41214 shown in FIGS. 4-FIG. 6D can also be applied in the vibration sensor 200 shown in FIG. 2A. In addition, the quality element 4121 of FIGS. 4-FIG. 6D is illustrated only as an example, and its specific shape and structure can be referred to the contents of FIGS. 2A and 2B, and will not be further described herein.

Figure 7:
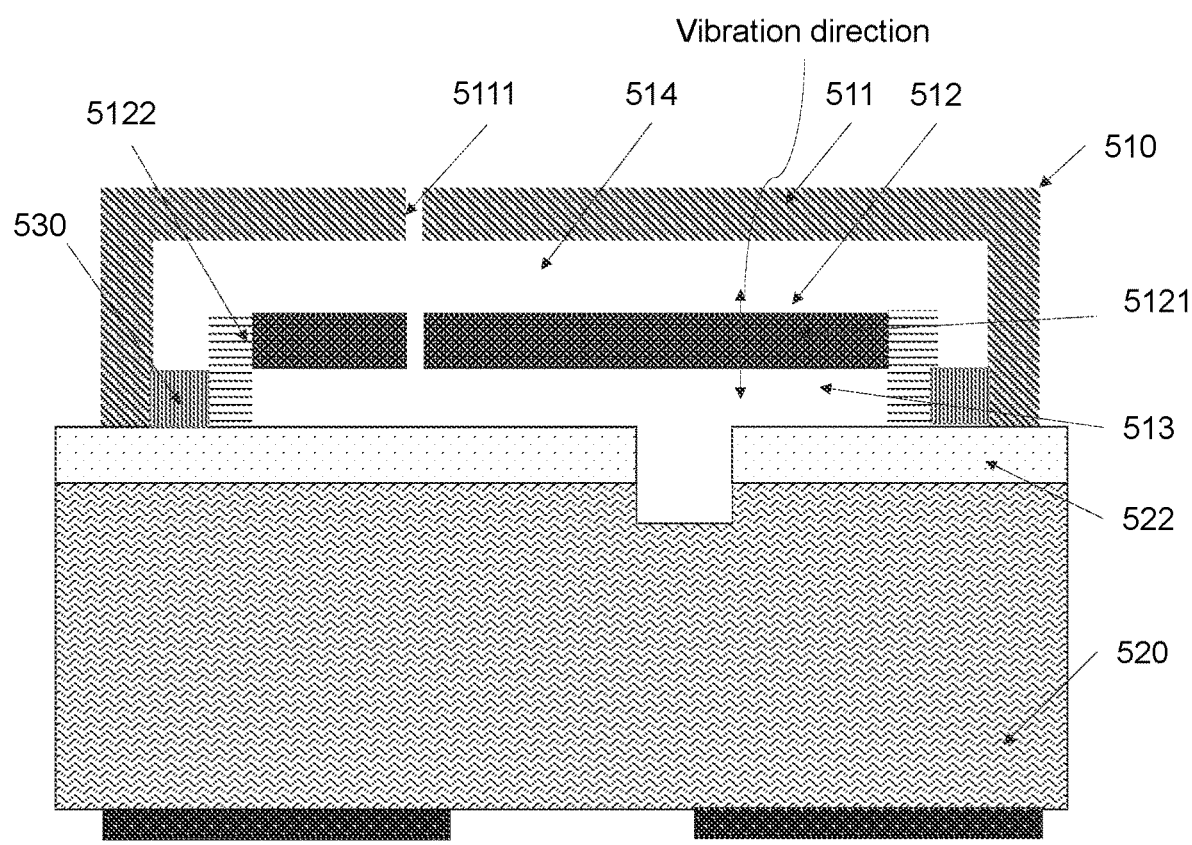
FIG. 7 is a schematic diagram illustrating a structure of a vibration sensor according to some embodiments of the present disclosure.

In some embodiments, when the elastic element is in a semi-fluid state during processing, or when the elastic element deforms during a high-temperature process, the size of the elastic element is not easily controlled, resulting in it occupying a large acoustic cavity space. In some embodiments, the vibration sensor may further include a limiting member, and the limiting member is located between the elastic element and the housing to limit the flow track of the elastic element in the high temperature state, thereby facilitating the control of the size of the elastic element. FIG. 7 is a schematic diagram illustrating a structure of the vibration sensor 500 according to some embodiments of the present disclosure. As shown in FIG. 7, the vibration sensor 500 includes a vibration receiver 510, an acoustic transducer 520, and a limiting member 530. The vibration receiver 510 may include a housing 511 and a vibration unit 512. The housing 511 may be connected to the acoustic transducer 520 to enclose an encapsulated structure with an acoustic cavity. The vibration unit 512 may be located within the acoustic cavity. The vibration unit 512 may separate the acoustic cavity into a first acoustic cavity 513 and a second acoustic cavity 514. The vibration unit 512 may include a quality element 5121 and an elastic element 5122. The elastic element 5122 may be connected around the side wall of the quality element 5121, extend toward the acoustic transducer 520, and be directly connected to the substrate 522. The substrate 522 is provided on the acoustic transducer 520, and the vibration receiver 510 may be provided on the substrate 522. The structure and components of the vibration sensor 500 are the same or similar to the structure and components of the vibration sensor 200 depicted in FIG. 2A. More description about the structure and components of the vibration sensor 500 can be found in FIG. 2A and description thereof, which is not repeated herein.

In some embodiments, the limiting member 530 is located between the elastic element 5122 and the housing 511. The limiting member 530 acts as a restriction on an outer wall of the elastic element 5122 to control the flow of the elastic element 5122 during the preparation of the vibration receiver 510, thereby better controlling the size and shape of the elastic element 5122.

In some embodiments, the limiting member 530 may be provided around the elastic element 5122. The side of the elastic element 5122 near the quality element 5121 is physically connected to the quality element 5121, and the side of the elastic element 5122 near the limiting member 53 is physically connected to the limiting member 53. In some embodiments, the limiting member 530 may be physically connected to the substrate 522. In some embodiments, the limiting member 530 may be, or not be in contact with the housing 511.

In some embodiments, the height of the limiting member 530 along the vibration direction of the quality element 5121 may be 100 μm to 1000 μm. As a preference, the height of the limiting member 530 along the vibration direction of the quality element 5121 may be 110 μm to 900 μm. As another preference, the height of the limiting member 530 along the vibration direction of the quality element 5121 may be 120 μm to 800 μm. As another preference, the height of the limiting member 530 along the vibration direction of the quality element 5121 may be 130 μm to 700 μm. As another preference, the height of the limiting member 530 along the vibration direction of the quality element 5121 may be 140 μm to 600 μm. As another preference, the height of the limiting member 530 along the vibration direction of the quality element 5121 may be 150 µm to 500 µm. As another preference, the height of the limiting member 530 along the vibration direction of the quality element 5121 may be 160 µm to 400 µm. As another preference, the height of the limiting member 530 along the vibration direction of the quality element 5121 may be 170 µm to 300 µm. As another preference, the height of the limiting member 530 along the vibration direction of the quality element 5121 may be 180 µm to 200 µm. And even more so preferably, the height of the limiting member 530 along the vibration direction of the quality element 5121 is equal to the height of the quality element 5121. This present disclosure does not limit the material and/density of the limiting member 530, for example, the limiting member 530 may be made of a non-permeable metal material.

In some embodiments, at least one third aperture portion 5111 may be provided in the housing 511 and pass through the housing 511. The structure of the third aperture portion 5111 is the same or similar to the structure of the first aperture portion 21213, as can be described in FIG. 2A, and will not be repeated here. The third aperture portion 5111 may allow the second acoustic cavity 514 to circulate with the outside gas, thereby balancing the change in air pressure inside the second acoustic cavity 514 caused by temperature changes during the preparation of the vibration sensor 500 (e.g., during reflow soldering), and reducing or preventing damage to the components of the vibration sensor 500 caused by that change in air pressure, e.g., cracking, deformation, etc. In addition, the third aperture portion 5111 may be used to reduce the damping generated by the gas inside the second acoustic cavity 514 when the quality element 5121 vibrates.

In some embodiments, the air conduction sound in the environment may affect the performance of the vibration sensor 500 in use. To reduce the effect of the air conduction sound in the environment, the third aperture portion 5111 on the housing 511 may be sealed by using a sealing material after the preparation of the vibration sensor 500 is completed, e.g., after reflow soldering. By way of example only, the sealing material may include epoxy adhesive, silicone sealant, etc., or any combination thereof. In some embodiments, the housing 511 may also be provided without the third aperture portion 5111.

It should be noted that the above description of FIG. 7 regarding the vibration sensor 500 and its components is for example and illustration purposes only and does not limit the scope of application of this present disclosure. For those skilled in the art, various corrections and changes can be made to the vibration sensor 500 under the guidance of this present disclosure. For example, the housing 511 may be in contact (e.g., physically connected) or indirect connect with the acoustic transducer 520. These amendments and changes remain within the scope of this present disclosure. It should be noted that the limiting member 530 shown in FIG. 7 can also be applied to the vibration sensor shown in FIG. 2A-FIG. 6D. In addition, the quality element 5121 of FIG. 7 is illustrated only as an example, and its specific shape and structure can be referred to the contents of FIGS. 2A-FIG. 6D, which will not be further described here.

Figure 8:
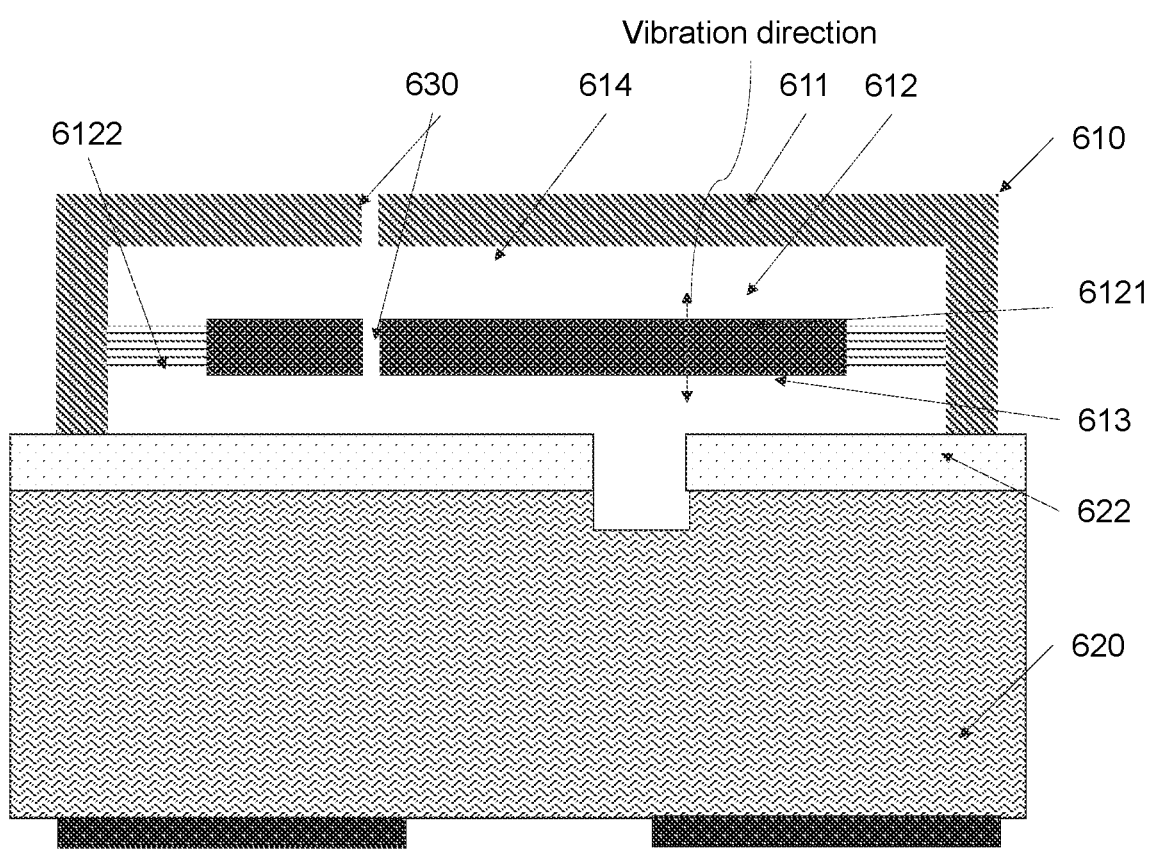
FIG. 8 is a schematic diagram illustrating a structure of a vibration sensor according to some embodiments of the present disclosure.

FIG. 8 is a schematic diagram illustrating a structure of the vibration sensor 600 according to some embodiments of the present disclosure. As shown in FIG. 8, the vibration sensor 600 includes a vibration receiver 610 and an acoustic transducer 620. The vibration receiver 610 may include a housing 611 and a vibration unit 612. The housing 611 may be connected to the acoustic transducer 620 to enclose an encapsulated structure with an acoustic cavity, the vibration unit 612 may be located within the acoustic cavity, and the vibration unit 612 may separate the acoustic cavity into a first acoustic cavity 613 and a second acoustic cavity 614. The vibration unit 612 may include a quality element 6121 and an elastic element 6122, with the quality element 6121 being connected to the housing 611 via the elastic element 6122. The structure and components of the vibration sensor 600 are the same or similar to the structure and components of the vibration sensor 200 depicted in FIG. 2A, as can be seen in FIG. 2A, and will not be repeated herein.

In some embodiments, the elastic element 6122 is snapped to the outer side of the quality element 6121, wherein the inner side of the elastic element 6122 is physically connected to the quality element 6121, and the outer side of the elastic element 6122 is physically connected to the housing 611. In some embodiments, the elastic element 6122 and the substrate 622 are at a certain distance in the vibration direction of the quality element 6121, wherein the elastic element 6122, the quality element 6121, the housing 611, and the substrate 622 form a first acoustic cavity 613; the elastic element 6122, the quality element 6121 and the housing 611 form a second acoustic cavity 614. When forming the first acoustic cavity 613 and the second acoustic cavity 614, the height of the quality element 6121 may be controlled by means of a jig (not shown in FIG. 8), for example, by placing the quality element 6121 on the jig, lifting the quality element 6121 by using the height of the jig itself, and then connecting the quality element 6121 to the housing 611 via the elastic element 6122. By achieving height control of the quality element 6121, the height of the first acoustic cavity 613 and the second acoustic cavity 614 can be controlled more stably. In some embodiments, the thickness of the elastic element 6122 along the vibration direction of the quality element 6121 is equal to the thickness of the quality element 6121. In some embodiments, the thickness of the elastic element 6122 along the vibration direction of the quality element 6121 is less than or greater than the thickness of the quality element 6121.

Figure 9:
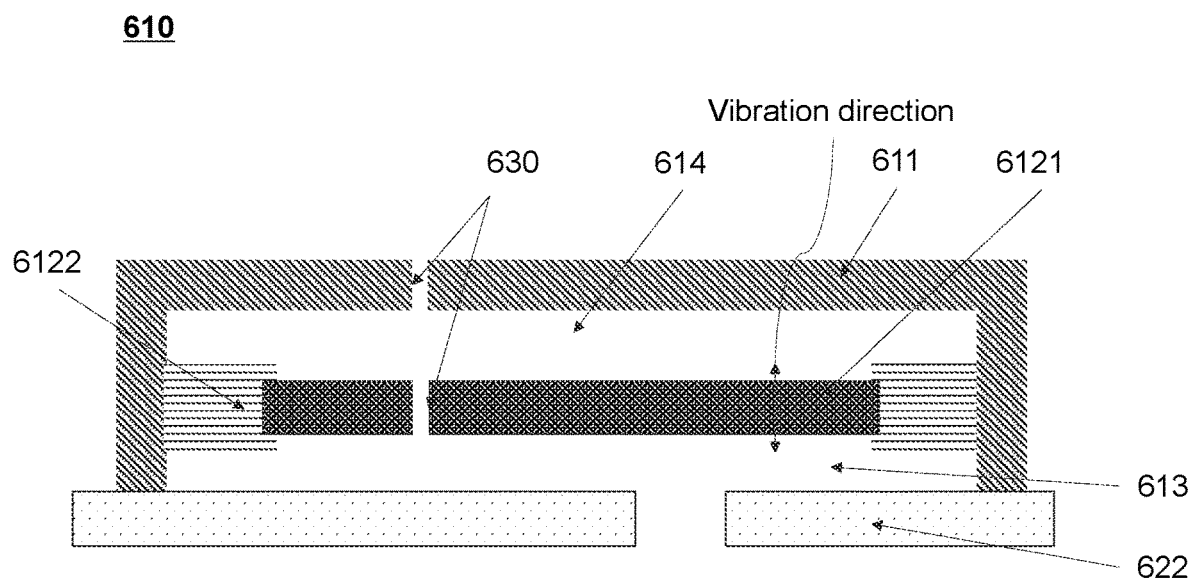
FIG. 9 is a schematic diagram illustrating a structure of a vibration transceiver according to some embodiments of the present disclosure.

FIG. 9 is a schematic diagram illustrating a structure of the vibration transceiver 610 according to some embodiments of the present disclosure. As shown in FIG. 9, in some embodiments, the thickness of the elastic element 6122 along the vibration direction of the quality element 6121 is greater than the thickness of the quality element 6121, wherein the sides of the elastic element 6122 along the vibration direction of the quality element 6121 may protrude relative to the sides of the quality element 6121 so as to increase the connection area between the elastic element 6122 and the quality element 6121, thereby increasing the strength of the connection between the two.

In some embodiments, the quality element 6121 may be provided with an aperture portion 630. The aperture portion 630 may penetrate the quality element 6121 to connect the first acoustic cavity 613 and the second acoustic cavity 614, thereby balancing the change in air pressure inside the first acoustic cavity 613 and the second acoustic cavity 614 due to temperature changes during the preparation of the vibration sensor 600 (e.g., during reflow soldering), reducing or preventing damage to the components of the vibration sensor 200 caused by such air pressure changes, e.g., cracking, deformation, etc. In some embodiments, the housing 611 may be provided with an aperture portion 630, and the aperture portion 630 may pass through the housing 611 to connect the second acoustic cavity 614 to the exterior. The aperture portion 630 may be used to reduce the damping generated by the gas inside the second acoustic cavity 614 when the quality element 6121 vibrates. The shape and structure of the aperture portion 630 may be referred to the relevant descriptions of the first aperture portion, the second aperture portion, and the third aperture portion elsewhere in the embodiments of the present disclosure, such as FIG. 2A and its related contents.

It should be noted that the descriptions of FIGS. 8 and 9 above with respect to the vibration sensor 600 and its components are for example and illustration purposes only, and do not limit the scope of application of this present disclosure. For those skilled in the art, various corrections and changes can be made to the vibration sensor 600 under the guidance of this present disclosure. For example, neither the housing 611 nor the quality element 6121 is provided with the aperture portion 630, or both the housing 611 and the quality element 6121 are provided with the aperture portion 630. These amendments and changes remain within the scope of this present disclosure.

The basic concept has been described above. Obviously, for those skilled in the art, the above detailed disclosure is only an example, and does not constitute a limitation to the present disclosure. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. Such as "one embodiment," "an embodiment," and/or "some embodiments" means a certain feature, structure, or characteristic associated with at least one embodiment of the present disclosure. Therefore, it should be emphasized and noted that two or more references to "an embodiment" or "one embodiment" or "an alternative embodiment" in various places in this specification are not necessarily referring to the same embodiment. In addition, some features, structures, or features in the present disclosure of one or more embodiments may be appropriately combined.

Furthermore, those skilled in the art will appreciate that aspects of this application may be illustrated and described in several patentable categories or situations, including any new and useful process, machine, product, or combination of matter, or combinations of them. of any new and useful improvements. Accordingly, all aspects of the present disclosure may be performed entirely by hardware, may be performed entirely by software (including firmware, resident software, microcode, etc.), or may be performed by a combination of hardware and software. The above hardware or software can be referred to as "data block", "module", "engine", "unit", "component" or "system". In addition, aspects of the present disclosure may appear as a computer product located in one or more computer-readable media, the product including computer-readable program code.

A computer storage medium may contain a propagated data signal with the computer program code embodied therein, for example, on baseband or as part of a carrier wave. The propagating signal may take a variety of manifestations, including electromagnetic, optical, etc., or a suitable combination. Computer storage media can be any computer-readable media other than computer-readable storage media that can communicate, propagate, or transmit a program for use by coupling to an instruction execution system, apparatus, or device. Program code on a computer storage medium may be transmitted over any suitable medium, including radio, cable, fiber optic cable, RF, or the like, or a combination of any of the foregoing.

The computer program coding required for the operation of the various parts of this application may be written in any one or more programming languages, including object-oriented programming languages such as Java, Scala, Smalltalk, Eiffel, JADE, Emerald, C++, C#, VB.NET, Python etc., conventional procedural programming languages such as C language, Visual Basic, Fortran 2003, Perl, COBOL 2002, PHP, ABAP, dynamic programming languages such as Python, Ruby and Groovy, or other programming languages, etc. The program code may run entirely on the user's computer, or as a stand-alone software package on the user's computer, or partly on the user's computer and partly on a remote computer, or entirely on the remote computer or server. In the latter case, the remote computer may be connected to the user's computer through any network, such as a local area network (LAN) or wide area network (WAN), or to an external computer (e.g., through the Internet), or in a cloud computing environment, or as a service Use e.g., software as a service (Saas).

Furthermore, unless explicitly stated in the claims, the order of processing elements and sequences described in the present disclosure, the use of numbers and letters, or the use of other names are not intended to limit the order of the procedures and methods of the present disclosure. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

Some examples use numbers to describe quantities of ingredients and attributes, it should be understood that such numbers used to describe the examples, in some examples, use the modifiers "about", "approximately" or "substantially" to retouch. Unless stated otherwise, "about", "approximately" or "substantially" means that a variation of +20% is allowed for the stated number. Accordingly, in some embodiments, the numerical parameters set forth in the specification and claims are approximations that can vary depending upon the desired characteristics of individual embodiments. In some embodiments, the numerical parameters should take into account the specified significant digits and use a general digit reservation method. Notwithstanding that the numerical fields and parameters used in some embodiments of the present disclosure to confirm the breadth of their ranges are approximations, in particular embodiments such numerical values are set as precisely as practicable.

Each patent, patent application, patent application publication, and other material, such as article, book, specification, publication, document, etc., cited in this application is hereby incorporated by reference in its entirety. Application history documents that are inconsistent with or conflict with the contents of this application are excluded, as are documents (currently or hereafter appended to this application) that limit the broadest scope of the claims of this application. It should be noted that, if there is any inconsistency or conflict between the descriptions, definitions and/or terms used in the attached materials of this application and the content of this application, the descriptions, definitions and/or terms used in this application shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A vibration sensor, comprising:
   a vibration receiver including a housing and a vibration unit, the housing forming an acoustic cavity, the vibration unit being located in the acoustic cavity and separating the acoustic cavity into a first acoustic cavity and a second acoustic cavity; and
   an acoustic transducer acoustically connected to the first acoustic cavity, wherein
   the housing is configured to generate a vibration based on an external vibration signal, and the vibration unit changes an acoustic pressure within the first acoustic cavity in response to the vibration of the housing, causing the acoustic transducer to generate an electrical signal;
   the vibration unit includes a quality element and an elastic element, a cross-sectional area of the quality element perpendicular to a vibration direction of the quality element on a side away from the acoustic transducer is smaller than a cross-sectional area of the quality element perpendicular to the vibration direction of the quality element on a side close to the acoustic transducer, and the elastic element is connected around a side wall of the quality element.

2. The vibration sensor of claim 1, wherein the quality element includes a first quality element and a second quality element, the second quality element being located close to the acoustic transducer, the first quality element being located on a side of the second quality element away from the acoustic transducer, a cross-sectional area of the first quality element perpendicular to a vibration direction of the quality element being smaller than a cross-sectional area of the second quality element perpendicular to the vibration direction of the quality element.

3. The vibration sensor of claim 2, wherein the first quality element is located in a central region of the second quality element, and a side wall of the first quality element has a specific distance to a side wall of the second quality element.

4. The vibration sensor of claim 3, wherein the elastic element includes a first elastic portion and a second elastic portion, two ends of the first elastic portion being connected to the side wall of the first quality element and to the second elastic portion, respectively, the second elastic portion extending toward and connected to the acoustic transducer.

5. The vibration sensor of claim 4, wherein the first elastic portion includes a first side surface and a second side surface, the first side surface being connected to the side wall of the first quality element, and the second side surface being connected to a surface exposed to the second acoustic cavity on the second quality element.

6. The vibration sensor of claim 5, wherein the side wall of the second quality element is connected to the second elastic portion.

7. The vibration sensor of claim 4, wherein the acoustic transducer includes a substrate, the second elastic portion extending toward and connected to the substrate, the substrate, the second quality element and the second elastic portion forming the first acoustic cavity.

8. The vibration sensor of claim 2, wherein in the vibration direction of the quality element, a thickness of the first quality element is from 50 μm to 1000 μm and a thickness of the second quality element is from 10 μm to 150 μm.

9. The vibration sensor of claim 8, wherein in the vibration direction of the quality element, the thickness of the first quality element is greater than the thickness of the second quality element.

10. The vibration sensor of claim 1, wherein in a cross section of the quality element in the vibration direction thereof, a connection line between an edge of the quality element on a side away from the acoustic transducer and an edge of the quality element on a side close to the acoustic transducer forms an angle with the vibration direction of the quality element, the angle being in a range of 10° to 80°.

11. The vibration sensor of claim 1, wherein the quality element includes a first aperture portion, the first aperture portion connecting the first acoustic cavity and the second acoustic cavity.

12. The vibration sensor of claim 11, wherein a radius of the first aperture portion is 4 μm to 50 μm 1 μm to 50 μm.

13. The vibration sensor of claim 1, wherein the housing includes a third aperture portion, the second acoustic cavity being connected to the exterior through the third aperture portion.

14. The vibration sensor of claim 1, wherein a limiting member is provided between the elastic element and the housing.

15. A vibration sensor, comprising: a vibration receiver including a housing and a vibration unit, the housing forming an acoustic cavity, the vibration unit being located in the acoustic cavity and separating the acoustic cavity into a first acoustic cavity and a second acoustic cavity; and
   an acoustic transducer, acoustically connected to the first acoustic cavity, wherein:
   the housing is configured to generate a vibration based on an external vibration signal, the vibration unit changes an acoustic pressure within the first acoustic cavity in response to the vibration of the housing, causing the acoustic transducer to generate an electrical signal,
   the vibration unit includes a quality element and an elastic element, the elastic element being connected around the side wall of the quality element and extending into the housing,
   wherein a thickness of the elastic element is greater than a thickness of the quality element in the vibration direction of the quality element.

16. The vibration sensor of claim 15, wherein the quality element or the housing is provided with an aperture portion, a radius of the aperture portion being 1 μm to 50 μm.

* * * * *